United States Patent [19]

Gruner

[11] 4,205,372
[45] * May 27, 1980

[54] CENTRAL PROCESSING UNIT EMPLOYING MICROPROGRAMMABLE CONTROL FOR USE IN A DATA PROCESSING SYSTEM

[75] Inventor: Ronald H. Gruner, Framingham, Mass.

[73] Assignee: Data General Corporation, Westboro, Mass.

[ * ] Notice: The portion of the term of this patent subsequent to Nov. 2, 1993, has been disclaimed.

[21] Appl. No.: 737,624

[22] Filed: Nov. 1, 1976

Related U.S. Application Data

[63] Continuation of Ser. No. 509,186, Sep. 25, 1974, Pat. No. 3,990,052.

[51] Int. Cl.² .......................... G06F 9/12; G06F 13/06
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,027,081 | 3/1962 | Evans et al. | 364/200 |
| 3,445,818 | 5/1969 | Yen | 364/200 |
| 3,518,632 | 6/1970 | Threadgold et al. | 364/200 |
| 3,599,176 | 8/1971 | Cordero, Jr. et al. | 364/200 |
| 3,634,883 | 1/1972 | Kreidermacher | 364/200 |
| 3,689,895 | 9/1972 | Kitamura | 364/200 |
| 3,839,705 | 10/1974 | Davis et al. | 364/200 |
| 3,958,221 | 5/1976 | Serra et al. | 364/200 |
| 3,972,024 | 7/1976 | Schroeder et al. | 364/200 |

*Primary Examiner*—Melvin B. Chapnick

*Attorney, Agent, or Firm*—Joel Wall; Jacob Frank

[57] ABSTRACT

A microprogrammed processor having a versatile hardware and data path configuration in which control signals for data paths, the ALU function, the shifter and all other control signals are derived from the current microprogram control word which is normally periodically clocked into a ROM buffer. Included are capabilities for effective addressing, incrementing the program counter and computer instruction skips, all while the instruction register is being loaded from memory by direct connection of selected bits of the memory bus to the ROM buffer to derive a micro-instruction. Also included is a conditional skip condition allowing the processor to skip the next instruction by testing selected bits of the instruction register which manipulates the micro-code for this purpose. Another capability is that of hardware structuring to readily accommodate WCS. Other capabilities provide for bit and byte manipulation, allowing the micro-instruction to readily load constants into the ALU, and for marking purposes. Data path connections provide for selective connection of the register file and the ALU output to the memory bus dependent upon existing memory bus and data bus communication with the memory. The above functions are accomplished with a fifty-six bit micro-instruction format implemented with a sixteen bit word length. which allows for a flexible instruction set for a microprogrammed processor enabling a system to be designed to span the range from a minicomputer to a large processor.

7 Claims, 20 Drawing Figures

| | A-IN | A | B | ALU | SH | L | CRY | MA | MC | RAN 1 | RAN 2 | TEST | PGTRUE | | PGFALSE | |
|---|---|---|---|---|---|---|---|---|---|---|---|---|---|---|---|---|
| PHANTOM | AR 17 | PC 00 | 0 17 | A1 15 | FO 17 | L 0 | N 3 | L 0 | N 3 | N 7 | N 7 | DEC 1 76 | X 1767 | | X 376 | |
| ---10-BYTES | N 05 | GRO 03 | ACS 17 | A/B 05 | RO 07 | L 0 | N 3 | N 1 | N 3 | DCH 6 | N 7 | DEC 2 75 | ZX 1400 | | X 000 | |
| COMMENT | ;GO TO LDBB, STBB | | | | | | | | | | | | | | | |
| COMMENT | ;DEC 2 ENTRY FOR LDBB | | | | | | | | | | | | | | | |
| ---11-LDBB | AR 17 | GRO 03 | X 00 | A 17 | N 17 | N 1 | N 3 | L 0 | N 3 | N 7 | N 7 | QBIT 43 | MHOB 1665 | | X 340 | |
| ---12-MHOB | AR 17 | PC 00 | ACD 15 | A 17 | FO 17 | L 0 | N 3 | L 0 | READ 0 | N 7 | BMEM 6 | LINK 51 | LLBY 1664 | | LUBY 263 | |
| ---13-LLBY | LBY 07 | ACD 15 | X 00 | A 17 | FA 14 | L 0 | N 3 | N 1 | READ 0 | N 7 | N 7 | LDIR 77 | ZX 1400 | | X 001 | |
| ---14-LUBY | UBY 00 | ACD 15 | X 00 | A 17 | SW 03 | L 0 | N 3 | N 1 | READ 0 | N 7 | N 7 | LDIR 77 | 7X 1400 | | X 001 | |

FIG. 13b

CENTRAL PROCESSING UNIT EMPLOYING MICROPROGRAMMABLE CONTROL FOR USE IN A DATA PROCESSING SYSTEM

This is a continuation, of application Ser. No. 509,186 filed Sept. 25, 1974, now U.S. Pat. No. 3,990,052 issued Nov. 2, 1976.

CROSS REFERENCES TO RELATED APPLICATIONS

It is noted that this application appears to claim subject matter disclosed in co-pending applications filed herewith entitled: "Microprogram Data Processing Technique and Apparatus" invented by Ronald Hans Gruner and Carl Justin Alsing, U.S. Pat. App. Ser. No. 509,182, and now U.S. Pat. No. 4,042,972; "Data Processing System" invented by Ronald Hans Gruner, U.S. Pat. App. Ser. No. 509,159, now abandoned, but continued as Ser. No. 749,911 which issued as U.S. Pat. No. 4,048,623, and; "Data Processing System" invented by Ronald Hans Gruner and Richard Thomas McAndrew, U.S. Pat. App. Ser. No. 509,183, and now U.S. Pat. No. 3,931,613.

FIELD OF THE INVENTION

The invention relates to a general purpose data processing unit for business and communication applications, and more particularly, to the central processing unit of such a device adapted to be controlled by micro-programs.

DESCRIPTION OF THE PRIOR ART

In the data processing field, the central processing unit (CPU) is well known to be the center of the computer system in that it governs all information transfers between itself and memory and between memory and the input/output devices. As known, CPU also executes all instructions and determines the orderly sequence of instruction execution.

It has become common to utilize within the CPU a micro-code processor, essentially being a computer within a computer, to control all the functions of the CPU. The advent of such a micro-code processor to control the functions of the CPU is one of the significant advancements in the computer field. By implementation of a micro-code processor, one may obviate the complicated, hard-wired logic circuits controlling the flow of data between the ALU, accumulators, memory and the I/O devices.

The micro-code processor essentially comprises a microprogram contained in extremely fast read only memories (ROM's) which are processed by the micro-code processor to control this data flow in a neat, well-ordered and consistent manner. Not only is this method extremely fast and often faster than the hard-wire computers, but it also means that the only limitation on size and power of the instructions set is the available ROM space.

SUMMARY OF THE INVENTION

It is an object of the present to provide a fast, versatile and powerful micro-code processor allowing for a variety of micro-instruction addressing capabilities. To some degree, this is accomplished by providing a machine architecture and method of operation which allows versatile data path architecture for increasing throughput. By selectively connecting the file register in the ALU output to the memory bus, increased speed is accomplished in handling frequently recurring machine instructions for which based upon predetermined states of selected signals control access to the memory.

Another object of the present invention is to provide a technique and apparatus for handling of a computer instruction just loaded into the instruction register by generating an initial micro-instruction by coupling selected signals loaded from the memory bus into the instruction register, for starting the machine in the proper section of micro-code without waiting for the next clock pulse. This is accomplished by disabling the ROM's and forcing the selected memory bus signal outputs directly through gates selectively connected to a ROM buffer in which the micro-instructions are temporarily stored before being decoded. Such a micro-instruction is called, for convenience, a "phantom". By use of such an operation, the period of time equalling that period for reading a micro-instruction word is saved.

A further object of the present invention is to additionally make use of such a "phantom" code to point to the next micro-instruction.

Yet a further object of the present invention is the provision of a technique and apparatus for providing constant and bit instruction data, under the micro-code processor control to one input of the arithmetic and logic unit.

DESCRIPTION OF THE PREFERRED EMBODIMENT

The computer system of the present invention concerns a general purpose computer having a sixteen bit word length, and is designed to span the range from mini-computer to large processor. Its central processing unit is made up of four program-accessible accumulators on which an arithmetic logic unit (ALU) operates, shifts and returns. The central processor unit is the control unit for the entire system and governs all information transfers between itself and memory, and between memory and the I/O devices. The central processing unit also executes all instructions and determines the orderly sequence of instruction execution. The processor handles words of sixteen bits which are stored in an appropriate memory, the bits of a word being numbered zero to fifteen, left to right. Registers that hold addresses are fifteen bits, numbered according to the position of the address in a word, i.e. one through fifteen. Words are used as either computer instructions in a program, as addresses or as operands (i.e. as data for the program). The program can interpret an operand as a logical word, an address, a pair of eight bit bytes or a sixteen digit signed or unsigned binary number.

Figure 1:
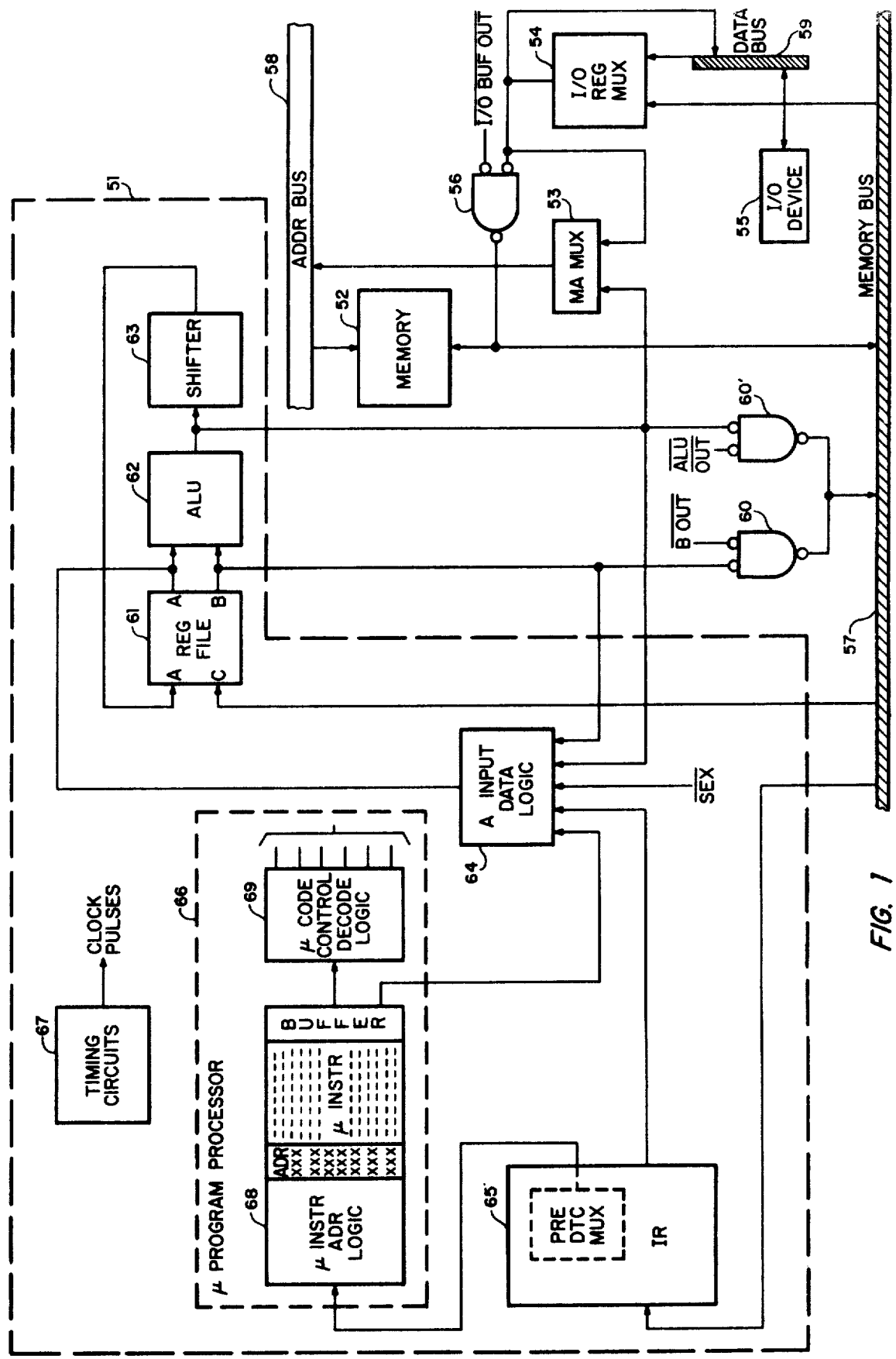
FIG. 1 is a general block diagram of a data processing system incorporating the present invention.

With reference to the drawings; there is generally shown in FIG. 1 a block diagram of a data processing system incorporating the present invention, including a central processing unit (CPU) 51, one or more memory units 52, a memory address multiplexer 53, and an I/O register multiplexer 54 for controlling one or more I/O devices 55. From the output of the I/O register multiplexer 54, there is connected a NAND gate 56 and a data bus 59. A memory bus 57 provides a bi-directional transfer of data or words between the CPU register file 61 and memory units 52. An address bus 58 permits transfer of memory address data from the CPU to the memory units 52 by way of the memory address multiplexer 53. The data bus 59 provides for transfer of I/O device data to memory from the I/O devices 55 via the I/O register multiplexer and NAND gate 56 enabled by I/O BUF OUT. In the other direction, access is had to the I/O device 55 from memories 52 via memory bus 57, the I/O register multiplexer, and the data bus 59.

It should be noted that within the present invention, suitable timing circuitry may be associated with each of the memory units 52, the latter timing circuitry being controlled so that its clock signal has a predetermined phase relationship with the main timing clock signal of the CPU timing system, as may be seen with reference to a co-pending U.S. Application Ser. No. 387,523 filed Aug. 10, 1973 for Data Processing System by Karsten Sorensen et al having a common assignee. Maintenance of such relationships insures that the operation of the particular memory unit in question does not interfere with operation of the CPU, and the proper operational sequence between such operations is maintained at all times without the need for elaborate synchronizing circuitry required in presently known asynchronous data processing systems where the memory clock and CPU clock operate completely independently of each other. This allows one to take advantage of fast semiconductor memory, yet retains the ability to use low slower core memory.

The central processing unit 51 is shown to comprise a register file 61. The register file contains (not shown) four accumulators designated as $AC_0$, $AC_1$, $AC_2$ and $AC_3$, three general registers designated as $GR_0$, $GR_1$, and $GR_2$, and a program counter PC. The register file is shown to have two output ports A and B and two input ports A and C. The output ports A and B are connected to an arithmetic logic unit (ALU) 62. The ALU 62 output is connected to a shifter 63, which output is further connected back to the A-input port of the register file 61. The C-input port of the register file 61 is connected from the memory bus 57. The A-output port of register file 61 is connected from the output of A-input data logic 64 and the B output port is connected to an input of A-input data logic 64.

The B output port is additionally connected to memory bus 57 by way of NAND gate 60 enabled by a signal $\overline{B\ OUT}$. The output of the ALU 62 is connected to the address bus by way of the memory address multiplexer 53 and connected to an input of the A-input data logic 64, and further connected to the memory bus 57 by way of NAND gate 60'. Although the memory bus is normally driven by the output of the ALU, this added flexibility allows, in addition to other capabilities, for creating an address on the address bus 58 by way of the ALU 62 and M.A. Mux 53 and simultaneously inserting data in the memory.

In this particular example, it will be seen that in repetitive operations including the steps of addressing memory and then inserting data, in almost fifty percent time savings may be achieved with a data path capability of the type described, as memory addressing and data insertion into memory might be often simultaneously accomplished. This is achieved, in part, by a microinstruction from microprogramer processor 66 for generating the signals $\overline{MC4}$ and $\overline{B\ MEM}$ to control the signals $\overline{ALU\ OUT}$ and $\overline{B\ OUT}$.

Such capability becomes invaluable with machine instructions such as store accumulator and/or load accumulator which frequently reoccur and therefore should be as fast as possible. Use of this capability may be explained as follows. In a store accmulator instruction in a device constructed in accordance with principles of the present invention, first, the effective address is resolved and put into the memory address; second, the program counter is incremented and the result inserted in the memory address and the ACD is written into memory, and; third, the next instruction is fetched. With the data path capability noted, the ACD may be written into memory and the program counter incremented and transferred to the memory address at the same time.

The CPU additionally includes an instruction register 65 which is separate from the register file 61, since its contents are constantly required by the central logic. The sixteen bits which comprise an instruction contain both an operation code and information associated with the operation to be performed. One output of the instruction register is illustrated in FIG. 1 to be connected to the A-input data logic 64, and the second output is coupled by way of a pre-decode multiplexer to a microprogram processor 66 containing blocks 68 and 69. Micro-instruction ADR LOGIC, addresses, microinstructions, and buffer are depicted as block 68, which is basically a plurality of micro-instructions contained in one or more pages of extremely fast read only memories (ROM's) uniquely addressed by micro-instruction addressing logic. The buffer of 68 feeds micro code control decode logic block 69. The micro-instructions control the flow of data between the ALU, accumulators, memory, and the I/O devices in a neat, well-ordered and consistent manner. All control signals in a microprogram machine are derived from the current microinstruction, which in the present invention resides in a fifty-six bit long ROM buffer designated as BUFFER in block 68.

The micro-instruction initially addresses a read only memory to select the next micro-instruction to be clocked into the ROM buffer. In the present system, the rising edge generated by the CPU timing circuit 67 may clock in a new micro-instruction into the ROM buffer as often as every two-hundred nanoseconds. As is discussed in the above referenced co-pending U.S. Pat. Application Ser. No. 387,523 to Karsten Sorenson et al, an asynchronous memory may extend the rising edge of the two-hundred nanoseconds period, so that the memory may satisfy data requests by the CPU. The fifty-six bit micro-instruction loaded into a buffer, as will be discussed hereinafter, has its outputs selectively connected to micro-code control decode logic 69, to generate the desired control signals for the orderly flow of data as determined by the micro-instruction.

The buffer output of the unit 68 also supplied signals to the A-input data logic 64 as is illustrated. A sign extend (SEX) signal is also supplied to the A-input data logic for EFA (effective address) calculations.

Data Paths, ALU and Associated Hardware

Figure 2:
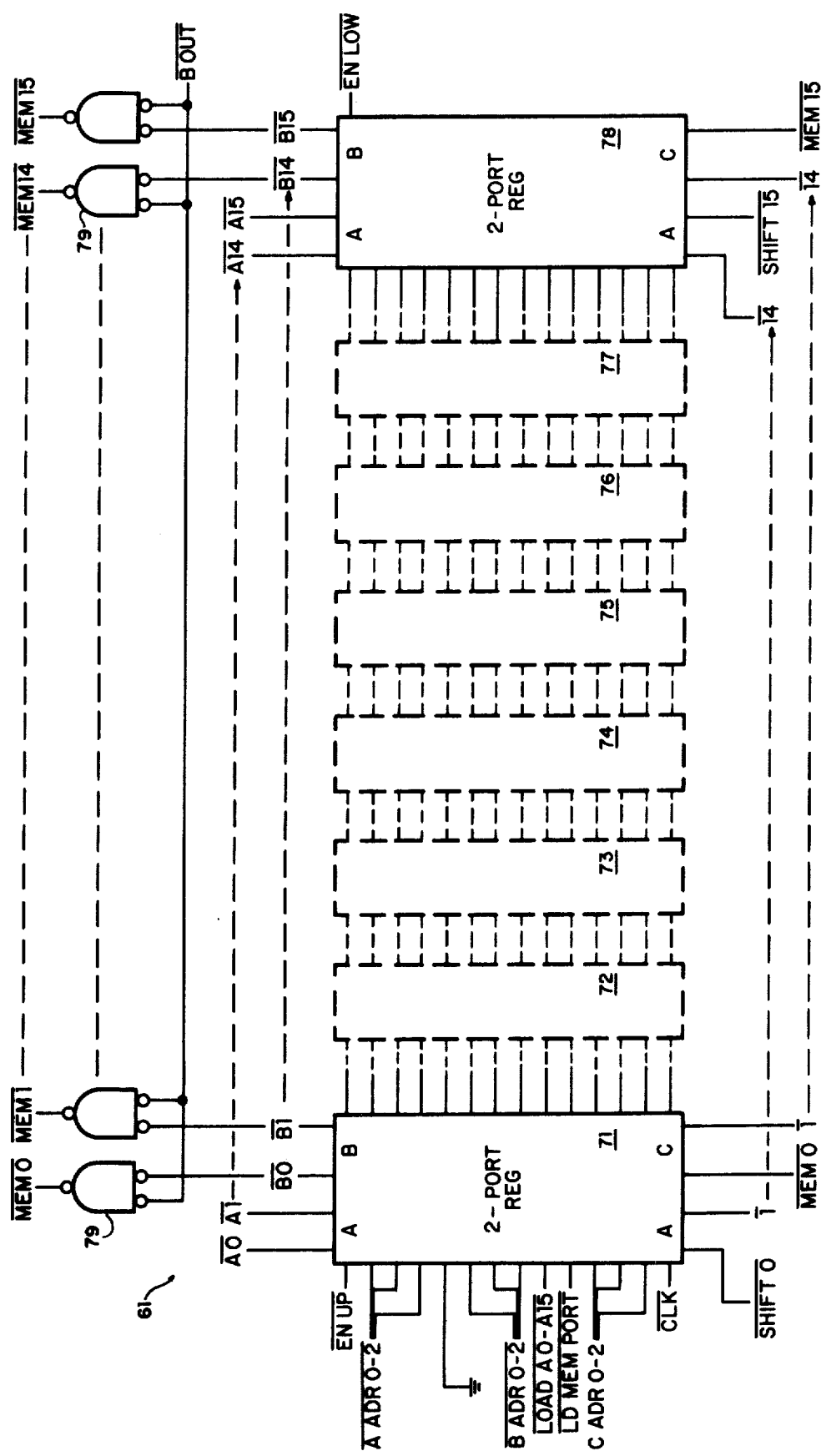
FIG. 2 is a schematic block diagram of the register file 61 of the present invention.

The register file 61 of the CPU unit comprises eight registers, as is illustrated in FIG. 2, which includes four accumulators which can be designated as $AC_0$, $AC_1$, $AC_2$ and $AC_3$, three general registers for temporarily storing data which can be referred to as $GR_0$, $GR_1$ and $GR_2$, and a program counter which can be denoted as PC. The registers are of the dual port type, e.g. SN74S172 available from the Texas Instruments Company, and comprise eight integrated chips 71 through 78, each containing eight two-bit words, any two words of which can be simultaneously read-out. In such an arrangement, two registers can also be simultaneously written into.

The registers 71 through 78 are shown to each have two write input ports A and C and two read output ports A and B, the latter being connected to the inputs of the ALU. The A addresses is controlled by signals A ADR0, A ADR1, and A ADR2, which select the word to be read out of the A port when $\overline{\text{EN UP}}$ (enable upper) is low. The A address word is also written into the A-input write port by use of the same signals as the grounded connection is low. Similarly, the C address selected to be written into the C input port is derived by use of the signals $\overline{\text{C ADR0}}$, $\overline{\text{C ADR1}}$, and $\overline{\text{C ADR2}}$ when enabled by the signal $\overline{\text{LD MEM PORT}}$, but only on the rising edge of the register clock. The use of the signal $\overline{\text{LD A0-15}}$ is used for decimal type operations.

The inputs to the two port registers 71 through 78 are received at the write input A portion in pairs from the shifter denoted as signals $\overline{\text{SHFT0}}$ to $\overline{\text{SHFT15}}$, whereby the signals supplied to the write input C port come in pairs from the memory bus denoted as signals $\overline{\text{MEM0}}$ to $\overline{\text{MEM15}}$. The read output signals from the dual port registers 71 through 78 are denoted as $\overline{A0}$ to $\overline{A15}$ which are connected from the A port to the A side of the ALU unit, and $\overline{B0}$ through $\overline{B15}$ are also coupled to the memory bus lines $\overline{\text{MEM0-MEM15}}$ through NAND gates 79 which are gated by the signal $\overline{\text{B OUT}}$.

Figure 3:
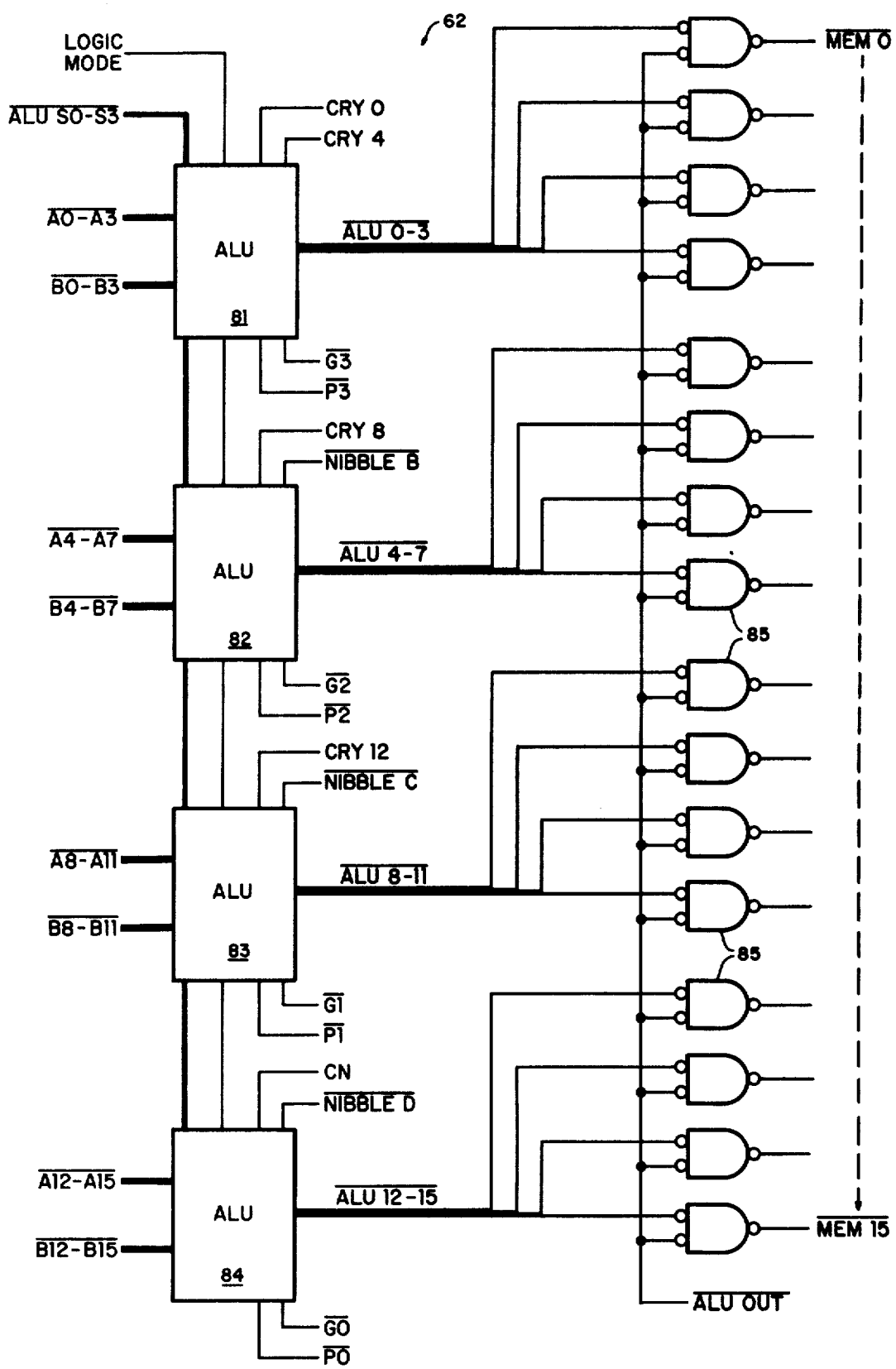
FIG. 3 is a schematic block diagram of the ALU 62 of the present invention.

In turning to FIG. 3, it may be seen that the present machine has an ALU unit consisting of four ALU integrated chips 81 through 84, which might be SN74S181 integrated chips made by the Texas Instruments Company. Each of the ALU IC chips 81 through 84 accepts an A and B four-bit input. In addition, a carry-in designated as CRY0 is also provided. These chips 81 through 84 each generate a four-bit ALU output result, as well as a carry-out designated as CRY, for example, and a $\overline{\text{NIBBLE}}$ (four bits) output to indicate one of the four bits out is low. Each ALU chip also has generating (G) and propagate (P) outputs used as carry look ahead signals to transfer the carry into the successive adder stage without ripple delay. In a sixteen bit parallel adder configuration, the carry look ahead's first stage produces a carry into the second stage of the adder if either the GO or the PO signal is true and there is a carry-in.

The arithmetic or logical functions performed on the inputs of the ALU units 81 through 84, is determined by the control signals on four input function select lines designated as $\overline{\text{ALU S0}}$ through $\overline{\text{ALU S3}}$ and a LOGIC MODE line. These control bits are derived from the microprogram word, as will be discussed hereinafter. The ALU output, in addition to being connected with shifter 63, as is illustrated in FIG. 1, is also coupled to the memory bus through a series of NAND gates 85 connected to each of the $\overline{\text{ALU0}}$ to $\overline{\text{ALU15}}$ outputs, and enabled by an ALU OUT signal to generate signals on leads $\overline{\text{MEM0}}$ through $\overline{\text{MEM15}}$.

Figure 4:
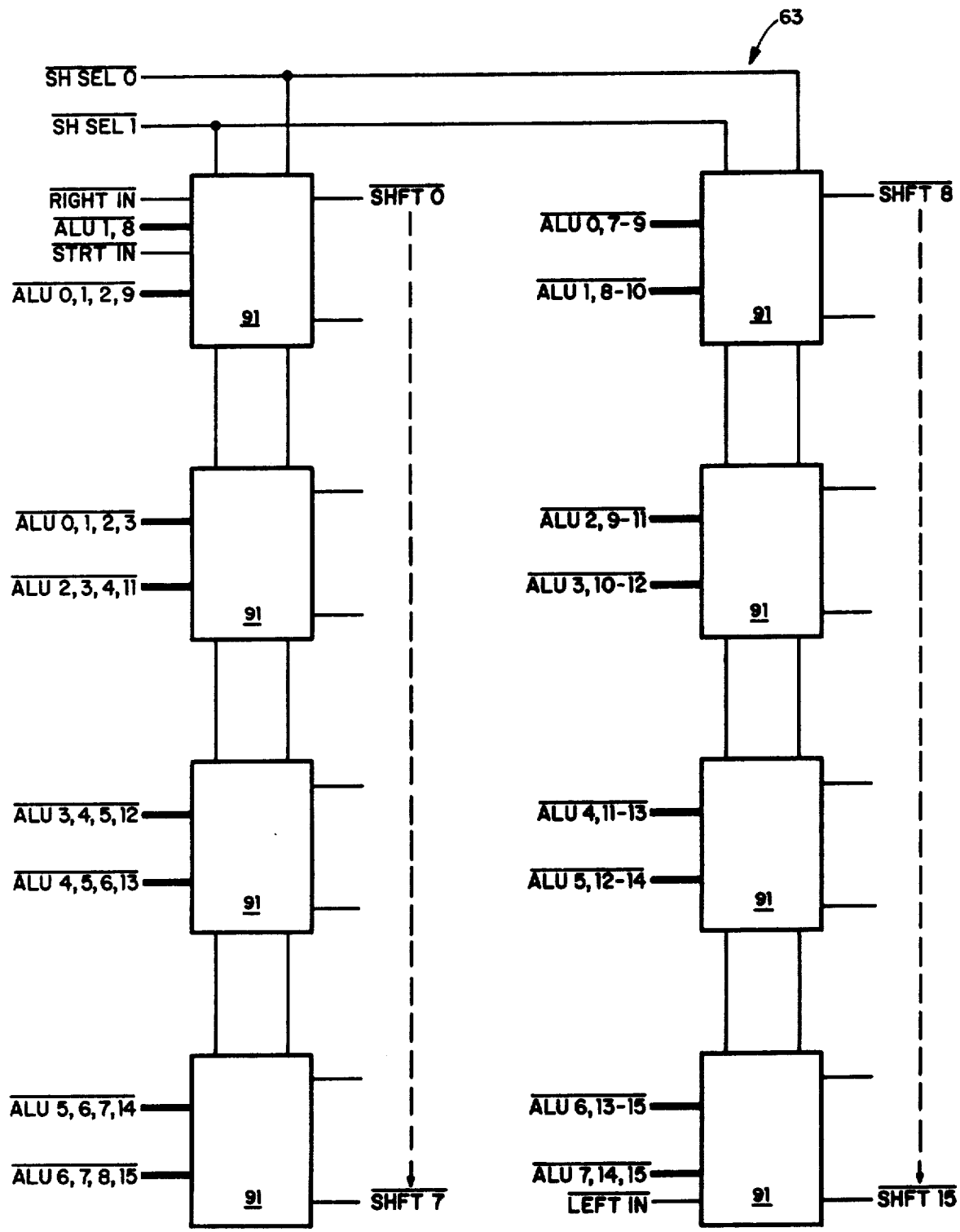
FIG. 4 is a schematic block diagram of the shifter 63 of the present invention.

With reference to FIG. 4, the shifter 63 of FIG. 1 is shown to comprise a group of eight multiplexer chips, each designated as 91, to provide functions such as swap, shift right, shift left, or leave unshifted, the adder output. The signals SH SEL0 and SH SHEL1 are determined by decoding of the micro-instruction and control the insertion of data from the adder output. The output $\overline{\text{RIGHT IN}}$, $\overline{\text{STRT IN}}$ and $\overline{\text{LEFT IN}}$ are also derived from decoding of the microprogram to control the shifting to be performed.

With reference to FIGS. 1, 2, 3 and 9, there is shown the data paths connected with the ALU and associated hardware which allow for increased speed in handling frequently recurring machine instructions such as store accumulator and load accumulator. As is illustrated, both the ALU 62 output and the B output port of the register file 61 are connected to the memory bus by way of NAND gates 60' and 60 as determined by the signal inputs for selectively enabling these gates, the signal inputs being controlled, in part, by selected bits of the addressed micro-instruction.

Figure 9:
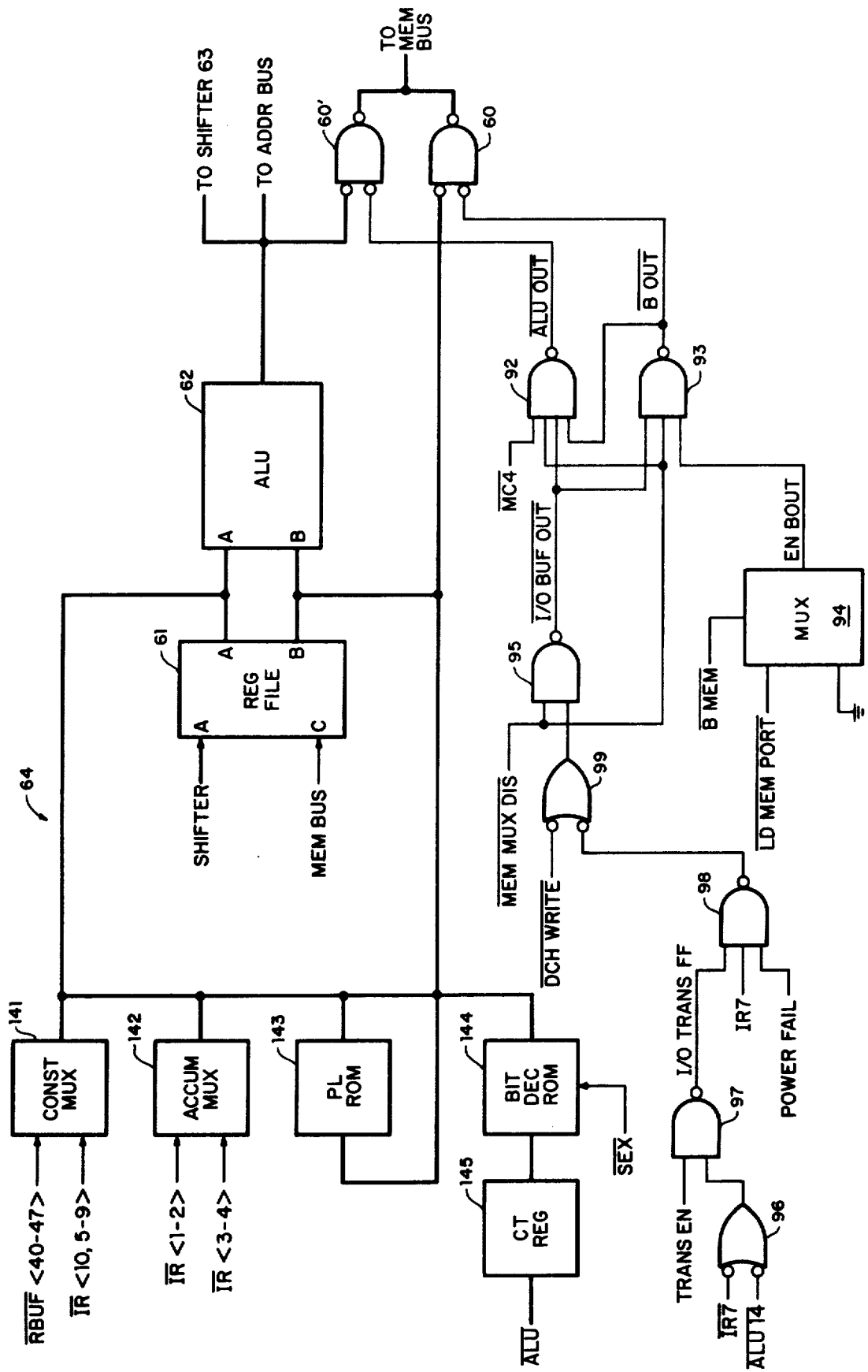
FIG. 9 is a schematic block diagram of the A-input data logic, data path control, and other portions of the CPU of FIG. 1.

In FIG. 9, the signal $\overline{\text{ALU OUT}}$ input when low will enable OR gate 60' and $\overline{\text{B OUT}}$ when low enables OR gate 60. In reviewing the signals which selectively control the outputs of gates 92 and 93, first $\overline{\text{MEM MUX DIS}}$ (normally high) goes low to denote an external device is taking over the MEM BUS to cause the CPU to be disconnected from the MEM BUS. The microcode signal $\overline{\text{MC4}}$ means read data on MEM BUS from memory into a general register so the ALU output is disconnected from the MEM BUS. ENB OUT is always low when the micro-code signal $\overline{\text{B MEM}}$ is not asserted for controlling the output of multiplexer 94. When asserting $\overline{\text{B MEM}}$ for write EN B OUT is high thus connecting the B port to the MEM BUS. When asserting $\overline{\text{B MEM}}$ for read, EN B OUT is low freeing the MEM BUS. $\overline{\text{I/O BUF OUT}}$ when low for CPU data in instructions, disconnects MEM BUS by making outputs of gates 92 and 93 high, denoting connection of memory with the I/O devices via DATA BUS feeding MEM BUS. This is determined by bits: IR7, ALU14 at NAND gate 96; TRANS EN and gate 96 outputs at NAND gate 97; gate 97 output, bits IR7 and POWER FAIL to NAND gate 98. The output of gate 98 will go low to effect the disconnect to allow the I/O REG MUX 54 to connect to MEM BUS. DCH WRITE goes low to also get $\overline{\text{I/O BUF}}$ low for disconnecting the MEM BUS connection at gates 60 and 60' so that the MEM BUS may be similarly driven from the I/O REG MUX 54.

Program I/O instructions which govern all transfers of data to and from the peripheral equipment, are performed with a combination of hardware and microcode noted above. In a "data in" instruction, I/O REG MUX 54 output is connected to the MEM BUS by enabling gate 56 in FIG. 1 by $\overline{\text{I/O BUF OUT}}$ going low which also makes gates 92 and 93 go high to disable the gates 60 and 60' to disconnect them from the MEM BUS. In a "data out" instruction the inverse occurs. As to data channel I/O where CPU delegates control of data channel to a peripheral, the same considerations as to control of gates 60 and 60' apply in a "data in" condition, however, in this case, $\overline{\text{DCH WRITE}}$ low is the controlling signal to disconnect these gates whereby $\overline{\text{I/O BUF OUT}}$ again enables gate 56 to connect I/O REG MUX to the MEM BUS.

Microprogram Processor

In a microprogram machine, as was earlier discussed, control signals are derived from the current microinstruction, which in the present invention will be shown to reside in a fiftysix bit long word in a ROM buffer. These micro-instructions are dedicated, for the most part, to the execution of the machine instructions. The signals derived from the micro-instruction control data paths, the ALU function, the shifter, etc. and it also addresses the read only memories to select the next micro-instruction to be clocked into the ROM buffer. In the present system, the rising edge of the CPU clock may clock in a new micro-instruction into the ROM buffer every two-hundred nanoseconds.

As will be later shown in greater detail, the format of the fifty-six bit micro-instruction might be considered as a collection of individual control fields providing bit control to effect multiplexers, read only memories and decoders, to route data, control the function of the ALU, and select the next micro-instruction. In total, sixteen control fields are implemented, as will become apparent.

Figure 5:
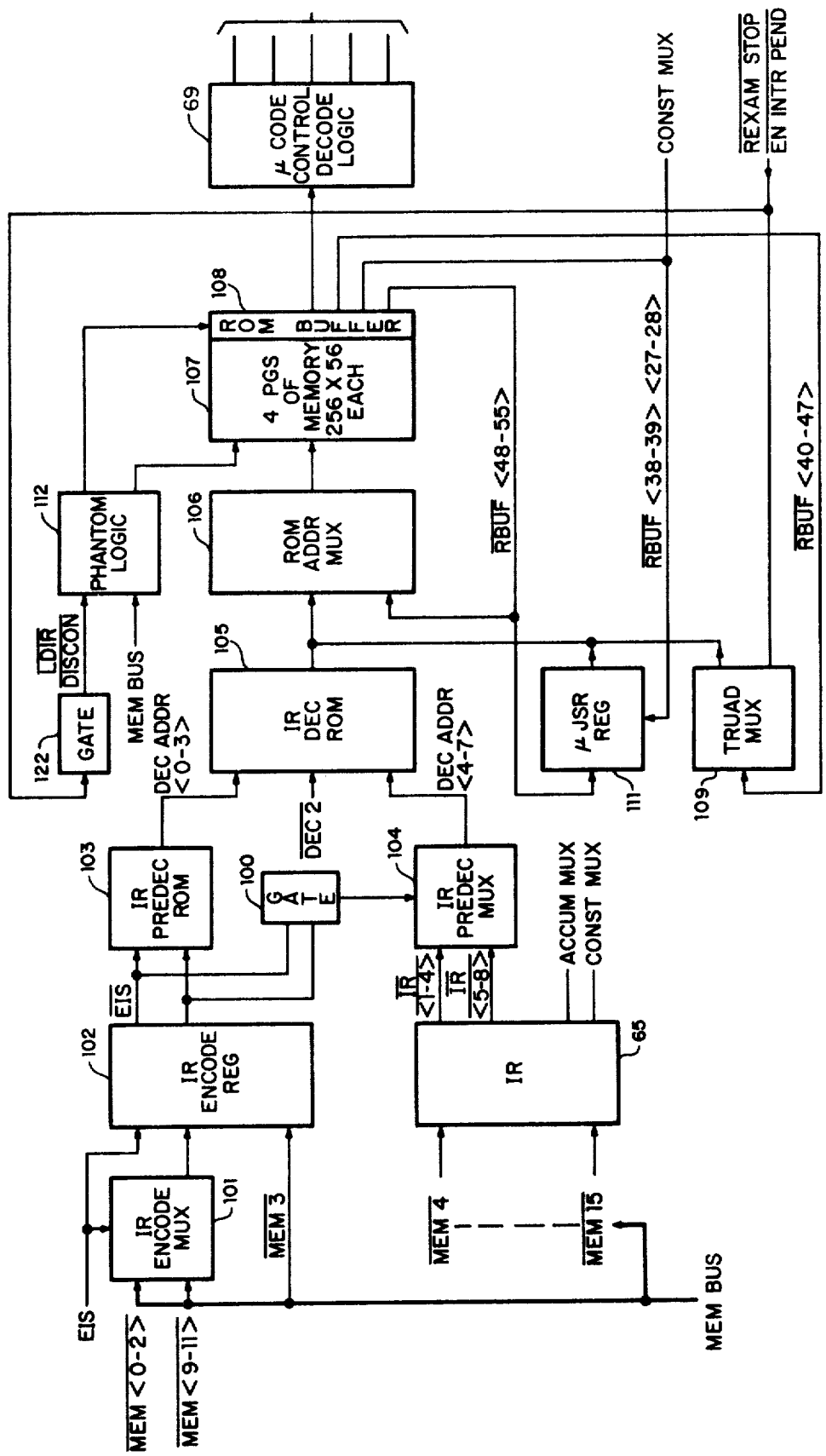
FIG. 5 is a general schematic block diagram of the microprogram processor 66 of the present invention.

The microprogram processor in the present invention may be seen with reference to FIG. 5 where there is shown the instruction register 65 adapted to receive information from the memory bus, the latter also having selected ones of its lines connected to the IR encode multiplexer and the IR encode register 102. The latter two units 101, 102, are controlled by an EIS signal which is derived from memory when an extended instruction is on the MEM bus. These extended instructions would be instructions that would otherwise be no-ops in a similar machine not having a microprogram processor capability. Each of the selected signals derived from the IR are respectively set into the IR predecode ROM 103 and the IR pre-decoder multiplexer 104, for extracting selected signals in the operational code to select a distinct address permanently encoded into the IR decode ROM 105 which contains a unique microinstruction address for each instruction opcode. In attaining this, the selected signals set into the IR predecode ROM 103 are also used to enable a gate 100 for selecting one of two groups of connections from the IR 65. The selected address is obtained by way of the ROM address multiplexer 106 which will designate from which of several input units, not only which microinstruction to be selected but, in addition, from which of the four pages of ROM's designated as 107, that microinstruction will be addressed and read-out to load the microinstruction so addressed into the ROM buffer 108.

The bits defining a micro-instruction loaded into the ROM buffer are routed to the control decode logic 64 to form a plurality of control signals for the early routing of the data within the system, as will be disclosed hereinafter. Pre-selected ones of these routed bits are used to enable the addressing of the ROM's 107 based on the contents of the instruction register 65. Other selected bits from the ROM buffer, as shown, are also fed to a truad multiplexer 109 for additional addressing of the ROM, and other selected bits are supplied to a $\mu$JSR (subroutine) register 111 for further addressing the ROM. Yet another manner of addressing the ROM is through use of selected bits in the ROM buffer itself which are directly connected back into the ROM address multiplexer 106.

By use of phantom code logic 112 when enabled by the output of gate 122, signals are directly routed from the memory bus for generating an initial micro-instruction with selected bits extracted from the op-code in the IR. This, as will be shown, saves time (a full clock pulse period) from reading an initial address from the IR to select the micro-instruction to be read out of the ROM.

Figure 6:
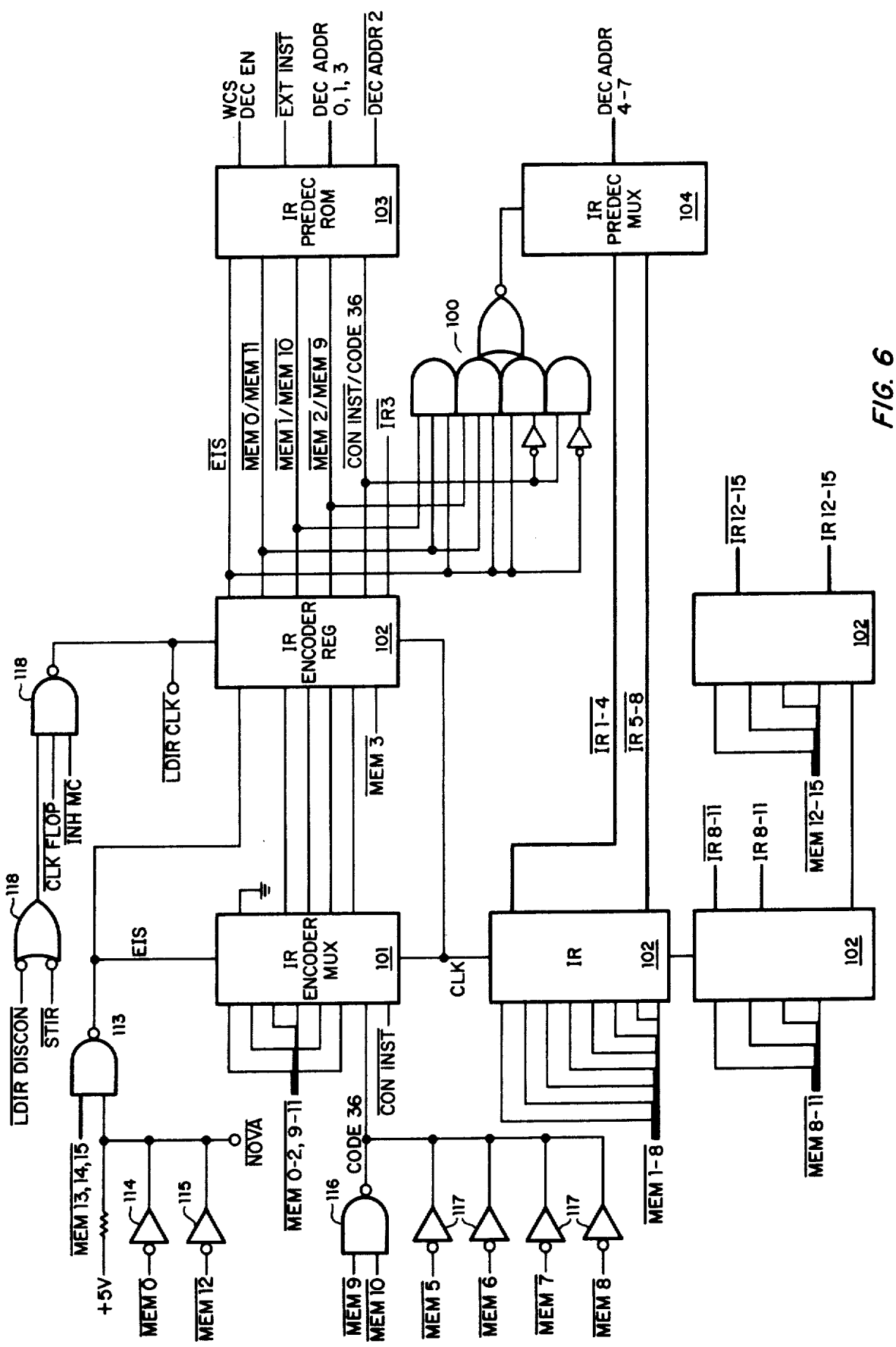
FIG. 6 is a detailed schematic block diagram of the instruction register, IR encoder multiplexer, IR encoder register and IR pre-decode multiplexer shown in FIG. 5.

Certain details of the instruction register operation, in connection with the microprogram processor, may be seen with reference to FIG. 6, wherein IR 102 is shown to comprise of three integrated chips inputted with bits $\overline{\text{MEM 4-15}}$. As was earlier discussed, the EIS signal in the IR encoder multiplexer 101 is employed to indicate the presence of extended instructions, in lieu of those no-ops. In the present invention, the work NOVA represents the earlier machines. The $\overline{\text{NOVA}}$ signal is coupled at NAND gate 113 with $\overline{\text{MEM 13,14,15}}$ to denote an extended instruction when $\overline{\text{MEM 0}}$ and $\overline{\text{MEM 12}}$ are low at the input of inverters 114 and 115 respectively. Alternatively, by tying $\overline{\text{NOVA}}$ to ground, EIS instructions become no-ops. EIS thus becomes the first bit of the IR register 102. The next four bits are also not an exact copy of the instructions read from the memory bus, but a preliminary decoding of the sixteen bit instructions. As shown, $\overline{\text{MEM 9,10}}$ at NAND gate 116 and $\overline{\text{MEM 5-8}}$ through a series of inverters 117, generate CODE 36 dedicated to commercial instructions. The four bits are $\overline{\text{MEM }\phi\text{-2}}$, 9-11. The outputs of the IR encoder register 102 include $\overline{\text{IR 0+11}}$, $\overline{\text{IR 1+10}}$, $\overline{\text{IR 2+9}}$, and $\overline{\text{CON INST}}$+CODE 36. For the non-EIS instruction, $\overline{\text{MEM }\phi\text{-2}}$ and $\overline{\text{CON INST}}$ are selected and for EIS instructions $\overline{\text{MEM 9-11}}$ and $\overline{\text{CODE 36}}$ are selected. As is noted, the different combinations of input signals for EIS and non-EIS will determine whether or not the output of the AND-OR-INVERT gates 100 will switch the IR pre-decode MUX 104. Such selections allow the IR pre-decode ROM 103 and the IR predecode multiplexer 104 to select distinct IR decode ROM addresses at the IR decode ROM 105 which contains a unique micro-instruction ROM address for each instruction op-code. The input signals to the IR pre-decode ROM 103 are selectively gated to control the IR predecode multiplexer 104 by switching to derive the signals $\overline{\text{DEC ADR 4-7}}$.

An example of the micro-code address permanently set into the IR pre-decode ROM to derive signals $\overline{\text{DEC ADR }\phi\text{-3}}$, may be seen in Table I. Also derived are WCS DEC EN for writable control store and $\overline{\text{EXT INS}}$ for external instructions e.g. commercial instructions. Each of these latter signals separately designate different pages of ROM's (not shown) to be addressed. Depending on whether EIS is high or low, a different set of inputs is applied to the IR pre-decode ROM 103 and IR pre-decode MUX 104 to generate different outputs to the IR decoder ROM 105. The octal addresses are determined by the following signal inputs on a right to left basis: $\overline{\text{CON INST}}$+CODE 36; MEM 2+9; MEM 1+1$\phi$; MEM $\phi$+11, and; EIS.

TABLE I

| OCTAL ADDRESS | WCS DEC ENAB | EXT INS | DEC ADDR0 | DEC ADDR1 | DEC ADDR2 | DEC ADDR3 |
|---|---|---|---|---|---|---|
| 00 | 0 | 0 | 0 | 0 | 1 | 1 |
| 01 | 0 | 0 | 0 | 0 | 0 | 1 |
| 06 | 0 | 0 | 0 | 0 | 0 | 0 |
| 10 | 0 | 0 | 0 | 0 | 1 | 0 |
| 15 | 0 | 0 | 0 | 0 | 0 | 1 |
| 20 | 0 | 0 | 1 | 1 | 0 | 1 |
| 21 | 0 | 0 | 1 | 0 | 0 | 1 |
| 23 | 0 | 0 | 1 | 0 | 0 | 0 |
| 24 | 0 | 1 | 1 | 1 | 0 | 0 |
| 25 | 0 | 1 | 0 | 1 | 0 | 1 |
| 27 | 0 | 1 | 0 | 1 | 0 | 0 |
| 30 | 0 | 0 | 0 | 1 | 1 | 1 |
| 34 | 1 | 0 | 0 | 1 | 0 | 1 |

A LDIR derived from decode of the micro-instruction causes an $\overline{\text{LDIR EN}}$ low signal to be generated. This normally holds $\overline{\text{LDIR DISCON}}$ low which via gates 118 holds $\overline{\text{LDIR CLK}}$ low until the next micro-instruction. The IR is therefore normally clocked at the very end of the micro-instruction during an LDIR.

Figure 7A:
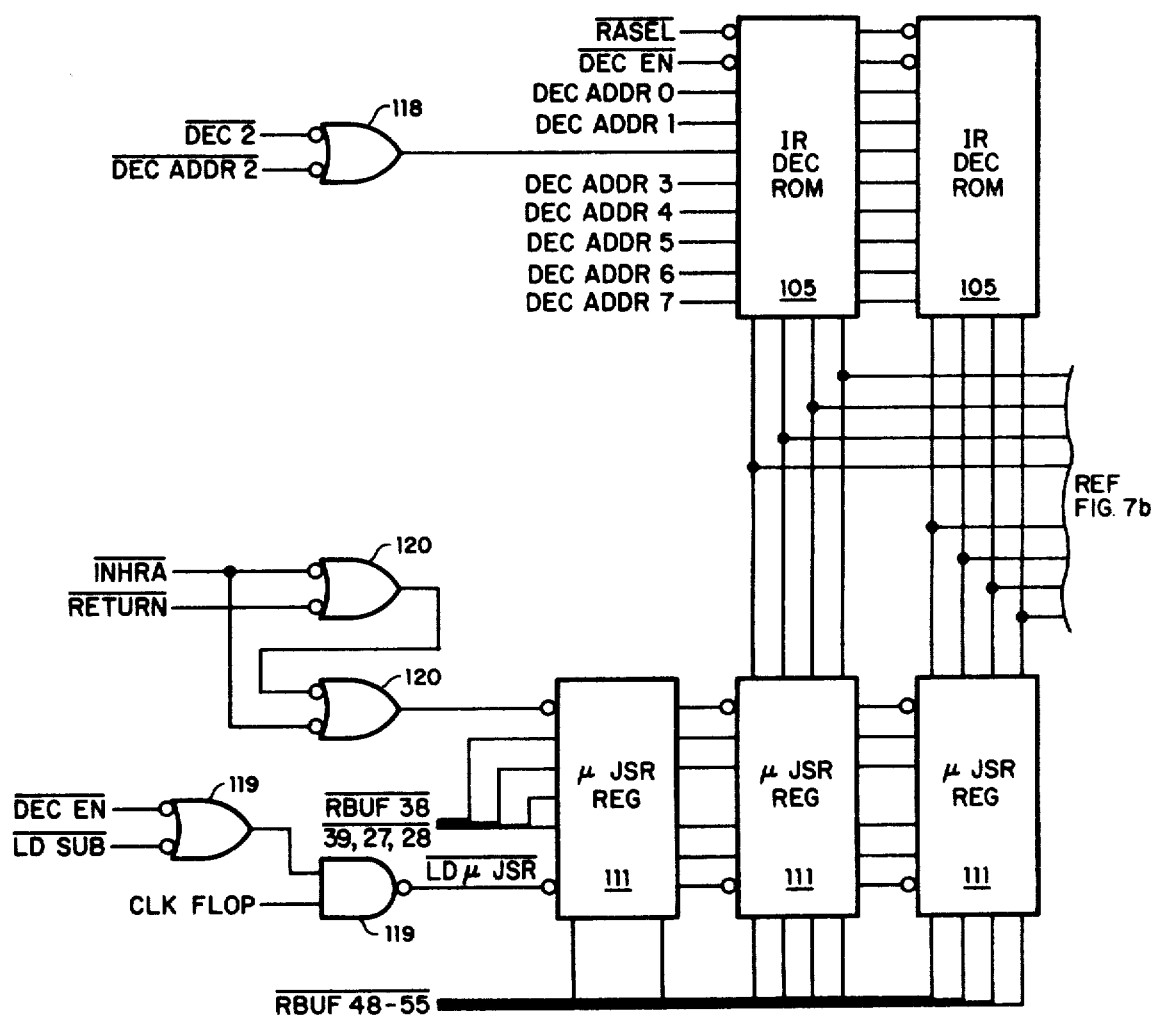
FIGS. 7a and 7b together represent a detailed schematic block diagram of the IR decode ROM, JSR register, truad multiplexer register and ROM address register shown in FIG. 5.

In turning to FIG. 7a, it may be seen that the address outputs from the IR pre-decode ROM 103 and IR pre-decode multiplexer 104, are set into the IR decode ROM 105 comprising of two integrated chips having an eight-bit output. The EIS instructions are allocated two IR decode ROM spaces, one for a DEC 1 address represented by DEC EN and another for a DEC 2 address. Both entries are derived from the micro-instruction decode control signals and depending on the configuration of signals (DEC 2 and DEC EN) desired will designate a selected one of two sets of addresses to be addressed by outputs of the IR pre-decode ROM 103 and IR pre-decode MUX 104. The IR decode ROM output is coupled with outputs from the μJSR register chips 111, and from the output of the traud multiplexer chips 109 to the input of the ROM address multiplexer chips 106. The μJSR register 111, in addition to having address R BUF feedback lines from micro-instruction bits 48-55, is also connected from selected control R BUF bits 27,28 and 38,39 for respectively writing in and reading out of one of the four μJSR registers formed by chips 111. This provides for a subroutine jump and alternation of microprogram flow based upon selective bits addressing a μJSR register 111 allowing one to save a current address while a new address is jumped to. The signal for loading of the μJSR register is derived from NAND gate 119 which in return is derived from a clock signal and from micro-instruction decode control signals via NOR gate 119'. The input to the ROM address multiplexer is, in part, selectively accomplished through $\overline{\text{DEC EN}}$ and $\overline{\text{RETURN}}$ which when low disable the traud multiplexer by allowing either the μJSR register via gate system 120 on the IR decode ROM to supply the ROM addresses.

Figure 7B:
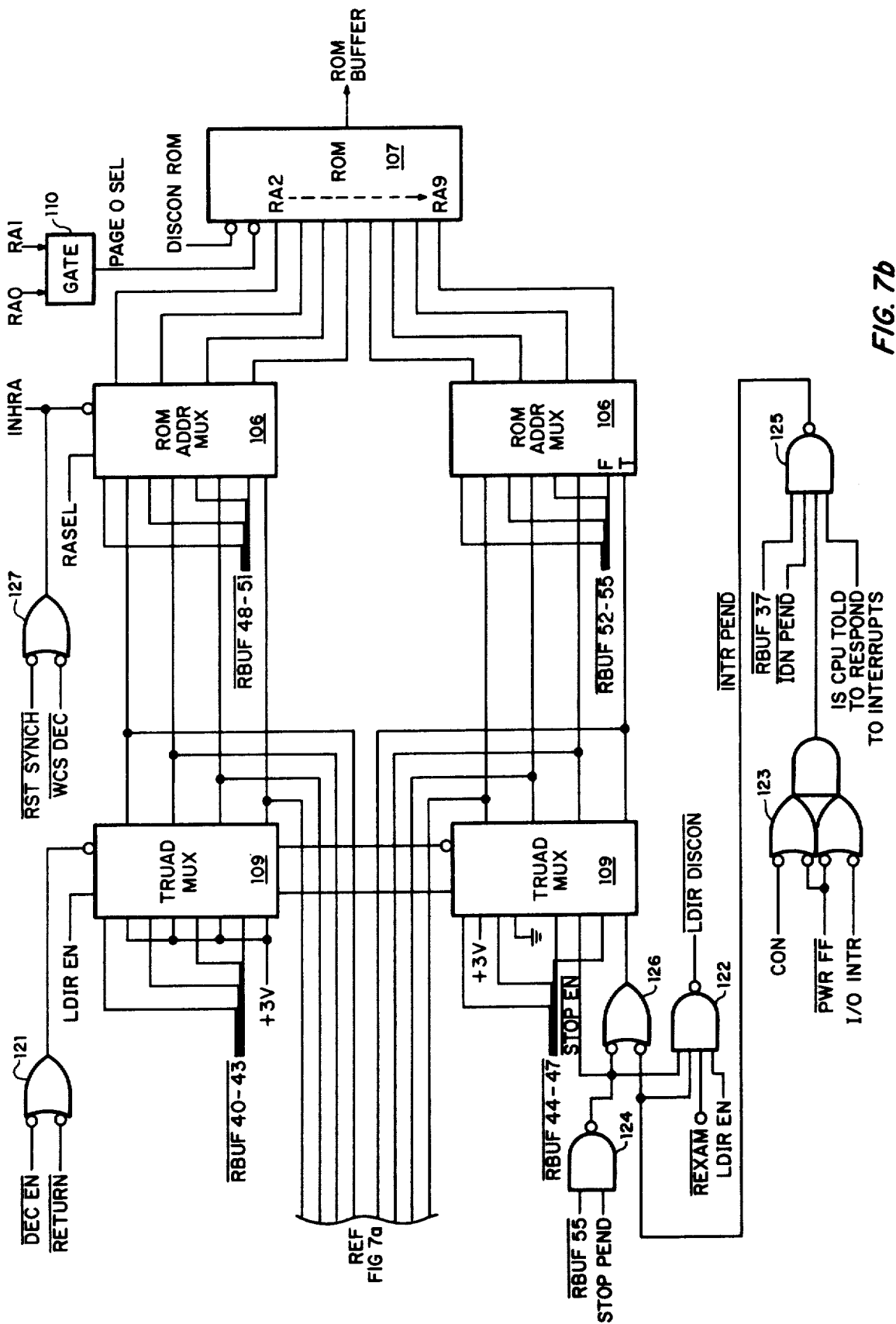

With reference to FIG. 7b, the traud multiplexer chips 109, are connected from the true address bits 40-47 in the R Buffer. When selection of that address is directed by the state change field in response to selected signals, the next micro-instruction selected will be based on the true address field and the true address multiplex register will have been enabled. However, as noted above, when $\overline{\text{DEC EN}}$ or $\overline{\text{RETURN}}$ supplied via NOR gate 121 are low, the traud multiplexer is disabled.

The state change LDIR causes the state change ROM to make $\overline{\text{LDIR EN}}$ to gate 122 low. The signals $\overline{\text{STOP ENAB}}$, $\overline{\text{REXAM}}$ from the console and $\overline{\text{INTR PEND}}$ from gate 125 can each keep $\overline{\text{LDIR DISCON}}$ at the output of gate 122 high. This condition does not disconnect the ROM's and does not enable a phantom micro-instruction. The LDIREN signal switches the traud address multiplexer 109 to a gate which generates either the running examine, interrupt or halt micro-instruction addressed on the ROM, one of which selects the micro-instruction clocked into the ROM buffer. With each of these, the loading of the IR is deferred and then reloading of the IR is later accomplished from the memory where pointed to by PC after completion of either the examine, interrupt or halt routine. These two signals set into the traud multiplexer would address the specific routine microprogram desired. Of course, halt would require a continue routine and program interrupt would store the PC in location $\phi$ for program resumption controlled by the programmer.

In the absence of $\overline{\text{STOP ENAB}}$, $\overline{\text{REXAM}}$ and $\overline{\text{INTR PEND}}$ signals, when the state change output of the decode logic is a LDIR EN, gate 122 is enabled to disconnect the ROM's and allow the phantom logic to generate a micro-instruction by passing selective signals to it from the MEM bus.

The interrupt routine alters micro-code flow from an external condition, whereas RUNNING EXAMINE looks at a memory address designated by the console switches and HALT merely calls for halting of the machine. Such a deferral of loading the instruction register occurs with the LDIR signal high. The CON, $\overline{\text{PWR FF}}$ IO INTR, and interrupt query signals via gates 123,125 all contribute to generate an $\overline{\text{INTR PEND}}$ signal whereby the R BUF 37 signal at the input to gate 125, in response to a particular micro-instruction, inhibits forcing of an interrupt address. On the other hand, R BUF 55 inhibits both the halt address via NAND gate 124 and the interrupt address via NOR gate 126.

The ROM address multiplexer 106 will respond to the output of the signals put out either by the IR decode ROM's 105, μJSR registers 111, or traud multiplexers 109. However, the inputs to gate 127 comprising the signals $\overline{\text{RST SYNC}}$ or $\overline{\text{WCS DEC}}$, can each cause INHRA to go high to disable the ROM address multiplexer 106. This enables writable control storage to force the RA's (ROM addresses) to any address. When enabled, the ROM address multiplexer selects either the false address (when RASEL is low) or the true address of the micro-instruction (RASEL is obtained from the decoding of the micro-instruction, as will be later discussed).

The outputs of the ROM address multiplex register 106 are fed into the ROM's 107 containing, in the preferred embodiment, four pages of ROM's of fifty-six bits long with two hundred fifty-six words on each page, having addresses RA2-RA9. Another input to each page of the ROM is derived from gate 110 having RA$\phi$, RA1 inputs which determine which one of the four pages is selected. A further input DIS CON ROM provides for disconnection of the ROM upon certain conditions existing, as will be described hereinafter.

Figure 8:
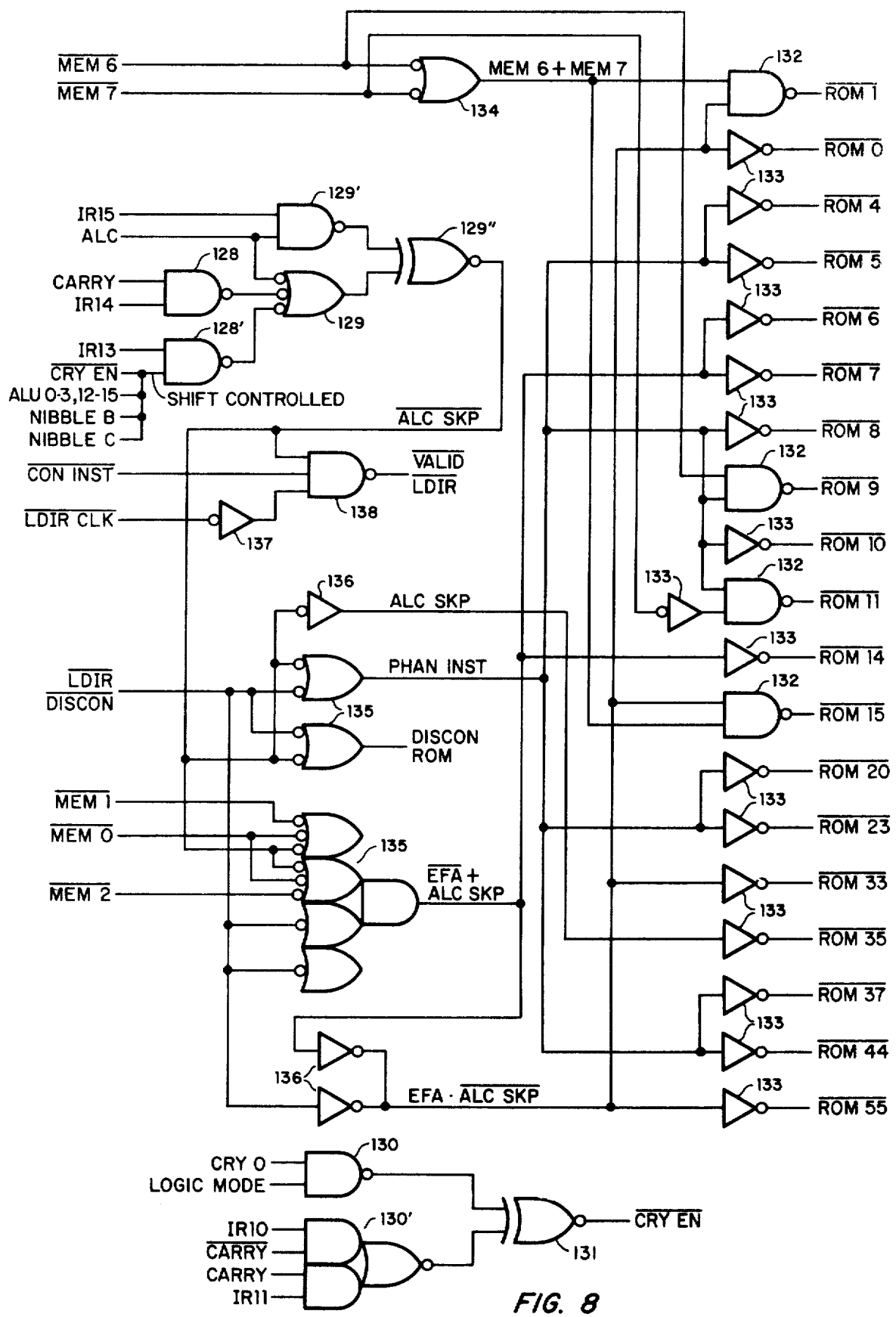
FIG. 8 is a detailed schematic diagram of the phantom logic 112 of FIG. 5.

The phantom logic 112 referred to in FIG. 5, may be best described with reference to FIG. 8, wherein there is shown a plurality of gates and inverting units, 132 and 133 respectively, which are connected to the designated inputs of the ROM buffer. As may be seen, these inputs are derived from MEM 0,1,2,6,7 signals on the memory bus, the MEM 6,7 signals being NORed at gate 134 and the MEM 0,1,2 signals connected through a gate configuration 135 to other selected gates and inverters, and to inverting units 136 and thence to the selected inputs of the ROM buffer. Gating unit 135 and inverters 136 are further gated by the $\overline{\text{LDIR DISCON}}$ signal when low to enable a phantom micro-instruction and to simultaneously disconnect ROM's 107, since a phantom instruction is directly coupled to the ROM buffer. An $\overline{\text{ALC SKP}}$ signal also, together with $\overline{\text{CON INST}}$ and $\overline{\text{LDIR CLK}}$ signals, via inverter 137 and NAND gate 138, generate a $\overline{\text{VALID LDIR}}$ signal. If the $\overline{\text{ALC SKP}}$ signal is low, skip is accomplished by causing the phantom instruction to increment the program counter, load the memory with PC and transfer control to the micro-instruction which reloads the instruction register.

The phantom logic 112 generates an initial microprogram word from a decoding of the op-code in the memory bus data being loaded into the instruction register. This hardware starts the machine in the proper section of code for the instruction in the IR. By reading this phantom as an initial sequence of the microcode, and not out of the ROM, a period of two hundred nanoseconds during which the computer instruction is being read in is not wasted.

The phantom generated micro-instructions are, for the most part, similar, whereby the program counter is incremented to prepare for fetching the next computer instruction. In total, there are six phantom micro-instructions, four of which are EFA type instructions and two of which are special instructions, the difference in the former four being the manner in which addresses are calculated. One of the two special phantom instructions is an $\overline{\text{ALC SKP}}$, whereby when $\overline{\text{ALC SKP}}$ signal is low the phantom micro-instruction generated will increment the program counter, load the memory address register with PC and transfer control to microcode which loads the next instruction. The second special phantom instruction is neither an EFA or $\overline{\text{ALC SKP}}$, but an EIS for initiating the extended instructions.

The generation of an $\overline{\text{ALC SKP}}$ signal to cause an $\overline{\text{ALC SKP}}$ phantom instruction will depend upon the computer instruction specified ALC operational code determined by IR bits 13,14,15. As illustrated, the ALC skip detection logic ANDS the effective carry with IR 14 at gate 128 and it ANDS the shifted Adder output with IR 13 at gate 128'. NIBBEL B and C represent the bits $\overline{\text{ALU 4-11}}$. The two end nibbles are shown broken down into explicit ALU bits as $\overline{\text{CRY EN}}$ can replace bits $\phi$ or 15 for right or left shifts. The two gated conditions and ALU via OR gate 129 can be inverted by $\overline{\text{IR}}$ 15 via NAND gate 129' to yield $\overline{\text{ALC SKP}}$ from exclusive OR gate 129". The term ALC low prevents $\overline{\text{ALC SKP}}$ from asserting low which inhibits skips except for ALC micro-code.

$\overline{\text{CRY EN}}$ on the other hand is derived from exclusive OR gate 131 connected from NAND gate 130 and gate 130'. $\overline{\text{LOGIC MODE}}$, from the ROM DECODE logic, gates out other than ALC arithmetic type operations (e.g. logical types). IR 10,11 bits are used to derive the complimented base value of carry from the true value of carry.

Thus in ALC operations, this allows a field within the computer to alter the computer instruction flow by manipulating the micro-code when a specified condition by the computer instruction skip field is met. This alternation of the computer instruction flow by the $\overline{\text{ALC SKP}}$ signal alters the microprogram word generated as a result of a LDIR such that instead of fetching the next computer instruction, it fetches the subsequent following computer instruction.

The following table discloses the occurrence of an ALC SKP.

TABLE II

| | ALC OP CODE | | | |
| | IR BITS | | | |
| MNEMONIC | 13 | 14 | 15 | SKIP FUNCTION |
|---|---|---|---|---|
| | 0 | 0 | 0 | never skip |
| SKP | 0 | 0 | 1 | always skip |
| SZC | 0 | 1 | 0 | skip on zero carry |
| SNC | 0 | 1 | 1 | skip on non-zero carry |
| SZR | 1 | 0 | 0 | skip on zero result |
| SNR | 1 | 0 | 1 | skip on non-zero result |
| SEZ | 1 | 1 | 0 | skip is either carry or result is zero |
| SBN | 1 | 1 | 1 | skip if both carry and result are non-zero |

A-Input Data Logic

Figure 10:
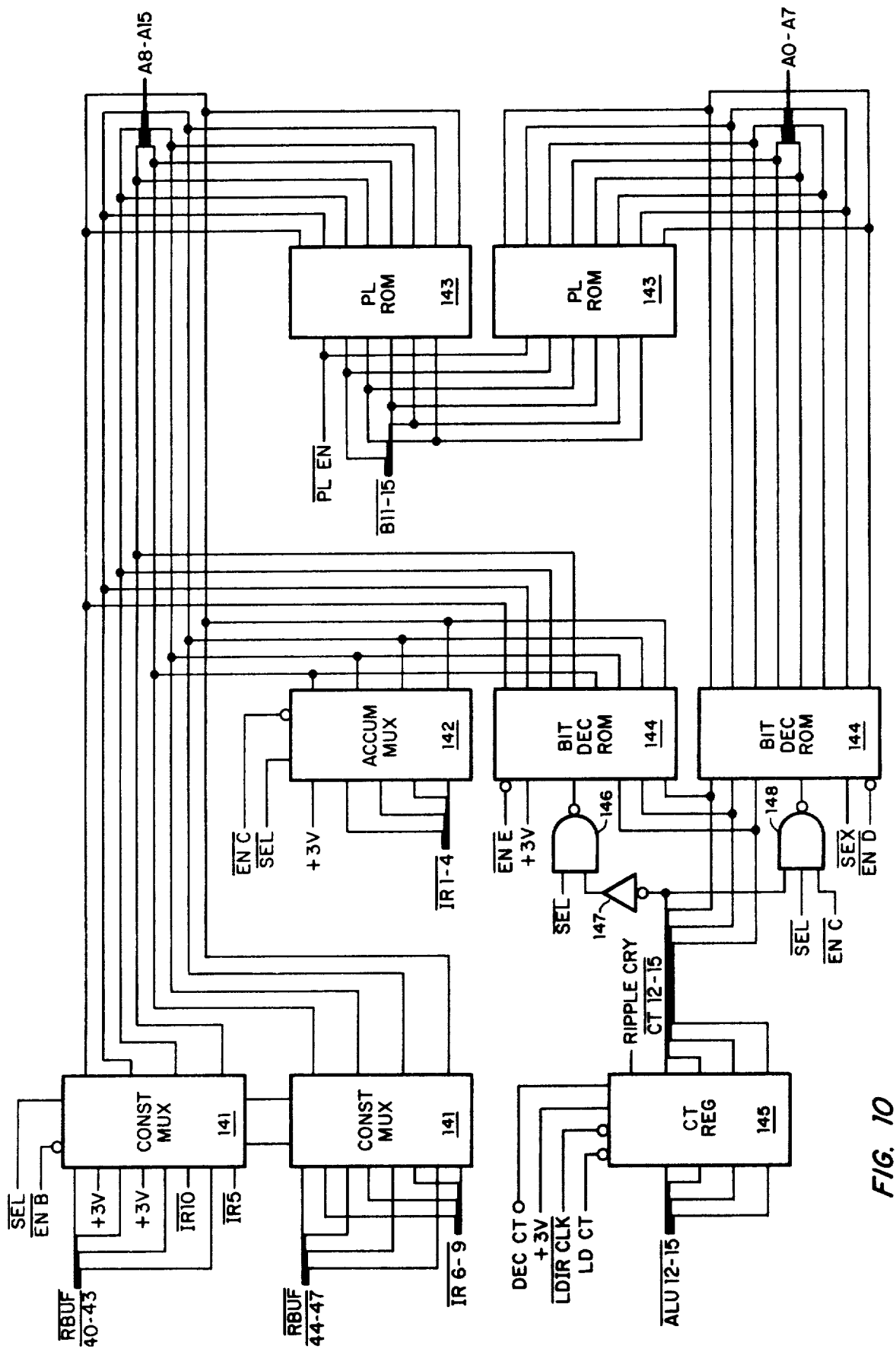
FIG. 10 is a detailed schematic block diagram of the A-input data logic shown in FIG. 9.

With reference to FIG. 9, there is shown the several units which comprise the A-input data logic 64. which are depicted yet in greater detail in FIG. 10. These units, as illustrated, are fed with selected bits of information generated from an instruction or state information in the case bit decoding and constants, to provide the ALU with data when required from a source other than the register file 61. One of these data sources includes a CONST MUX 141 (constant multiplexer) which may be enabled to provide R BUF 40-47 bits when EN B and SEL are low. In such a case, ENAB D to the bit decode ROM 144 will be low to enable the left byte bit decode ROM 144 to supply zeros to the A-input leads A$\phi$-A7. On the other hand, when the CONST MUX 141 is switched to IR10,59 by SEL high, the op-code is extracted from the user defined instructions to provide access to a proper address in a "trap table" (list of addresses in memory required for XOP instruction) in memory for dispatching to pre-selected code routines.

With respect to the ACCUM MUX 142 (accumulator multiplexer) this is an AC specifier used as an add immediate field with IR bits. $\overline{EN\,C}$ from the micro-instruction is low, the multiplexer respectively connects bits $\overline{IR\,1,2}$ to $\overline{A\,14,15}$ and a low $\overline{SEL}$ selects the ACS specifier bits. Further, an $\overline{EN\,C}$ low and SEL high respectively connects bits $\overline{IR\,3,4}$ to $\overline{A\,14,15}$ to select the ACD specified bits. The program load (PL) ROM 143 contains two ROM chips having 32 sixteen bit instructions. It is enabled by $\overline{PL\,EN}$ from the micro-instruction to connect the program instruction addressed by the B side of the adder to the A side of the adder.

Connected to the input of the bit decode ROM chips 144, is a count register (CT. REG.) 145 which is coupled from the ALU 12-15 bits, to generate, in one mode as selected by DEC CT, a four bit count determining which input is low by a pre-selected formula for logical shifting, whereby the RIPPLE CRY output is monitored. In another mode, LD CT and $\overline{LDIR\,CK}$ will load the counter (now merely acting like a register) with the last four bits 12-15 of the ALU. Now these four bits serve as a bit pointer. When $\overline{SELECT}$ and $\overline{ENAB\,E}$ are both high, $\overline{COUNT\,12}$ selects a bit from bit decode ROM 144 in the range of A$\phi$-7, whereby when $\overline{COUNT\,12}$ is low it selects a bit from the bit decode ROM 144 in the range A8-15. $\overline{COUNT\,13,14,15}$ are the other inputs to the bit decode ROM's for selection of the specified bit acting as a bit mask to generate a bit for resetting or testing in the bit instruction routines.

Because the IC chips have floating outputs to the A-input field of the ALU until enabled, the bit decode ROM 144 is used to supply zeros of ones as needed when byte type data is connected to the ALU. An $\overline{ENAB\,D}$ low enables the left byte bit decode ROM 144 to supply zeros to A$\phi$-A7, whereas an $\overline{ENAB\,E}$ low enables the right byte bit decode ROM to supply zeros to $\overline{A8\text{-}A15}$. The $\overline{ENAB\,D}$ low and $\overline{ENAB\,E}$ low, enable both bit deocde ROM's 144, which in turn supply all zeros to the A side of the adder. The SEX (sign extended) signal reflects the level of IR8, in the right byte, and causes the left byte bit decode ROM 144 to supply all ones or all zeros accordingly, depending upon a sign. Thus, the lower byte of the register can be sign extended.

Microprogram Control Word

Figure 11:
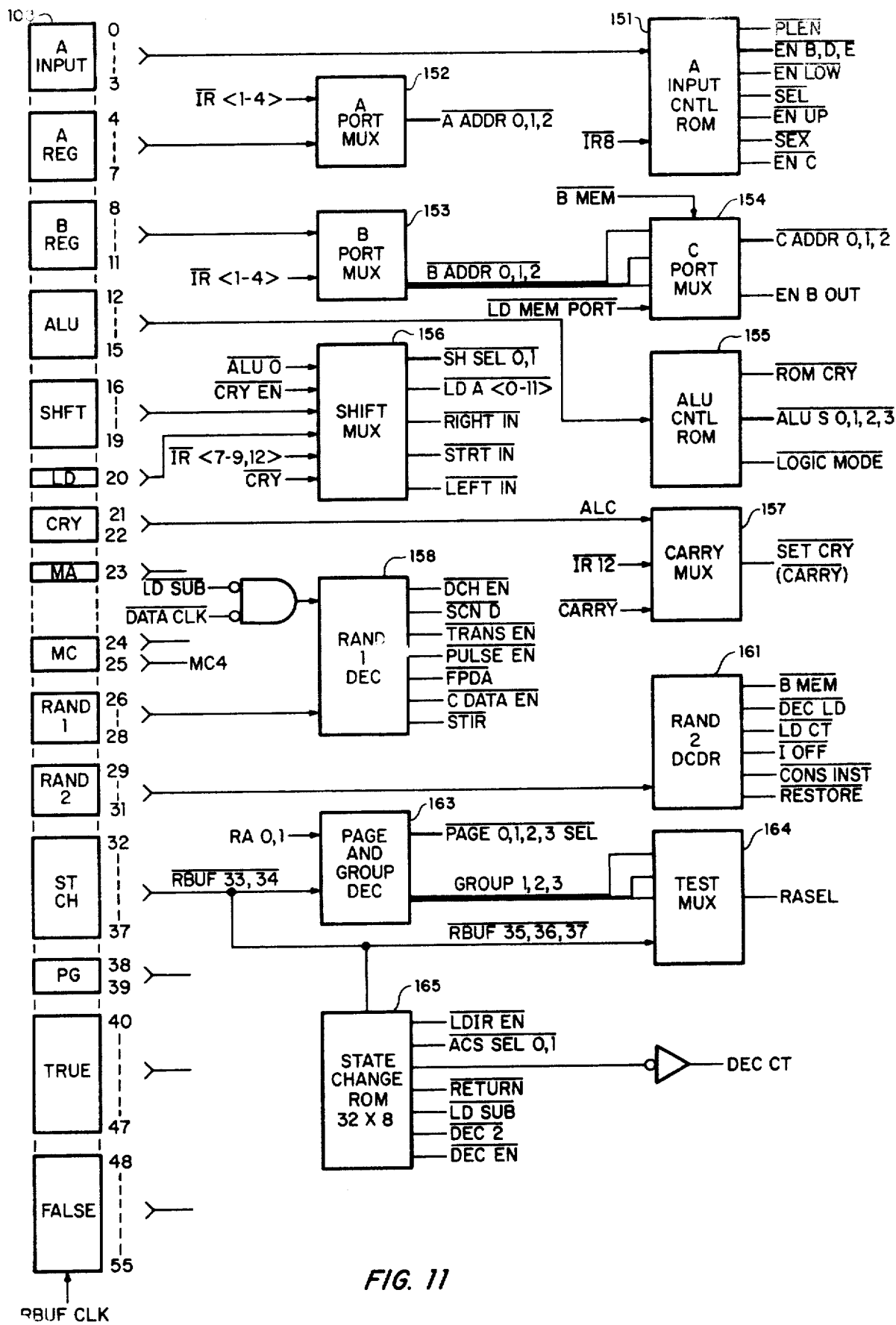
FIG. 11 is a schematic block diagram of the micro-instruction field format and the micro-code decode control logic 69 shown in FIG. 1.

In turning to FIG. 11, a micro-instruction word is shown at the ROM buffer 108 output to be a collection of individual control fields. The effects of valid bit combinations for each of the fields is briefly summarized whereby pre-selected bit combinations, as will be illustrated, route data, control the function of the ALU and select the next microprogram word. A collection of micro-instruction words forms a microprogram and accomplishes the operation needed to perform a computer instruction. Each of the control fields of the micro-instruction word will now be individually discussed.

The A-input control field, defined by $\overline{R\,BUF}$ bits 0-3 controls what data is connected to the sixteen bit A-input data path to the ALU. These four R BUF binary inputs are connected to an A-input control read only memory 151 having twelve combinations of input bit levels, represented by the signals shown in Table III on the following page designated as octal contents. The octal address representative of the octal content is based on, proceeding right to left, the following input signals: $\overline{R\,BUF\,3,2,1,0}$. The word addressed provides the bit combination output signals disclosed. For example, for a CON (constant) signal represented by an octal address of 24, a $\overline{PL\,EN}$ output would be low, the $\overline{EN\,B}$ output would be high, $\overline{EN\,D}$ output would be high, and $\overline{EN\,E}$, $\overline{EN\,UP}$ and $\overline{EN\,LOW}$ outputs would be low. Other A-input control signals generated are: $\overline{SELECT}$, which is the same as $\overline{R\,BUF\,0}$, and; $\overline{EN\,C}$ which occurs when $\overline{R\,BUF\,1,2}$ are high and $\overline{R\,BUF\,3}$ is low.

TABLE III

| | A-INPUT CONTROL ROM MAP | | | | | | |
|---|---|---|---|---|---|---|---|
| OCTAL ADR | ENABLE | | | | | | |
| | PL | B | D | E | UP | LOW | OCTAL CONTENTS |
| 00 | 0 | 0 | 0 | 1 | 1 | 0 | Upper Byte (UBY) |
| 01 | 0 | 1 | 1 | 0 | 0 | 0 | Complement of constant (CCN) |
| 03 | 0 | 0 | 1 | 0 | 0 | 1 | Sign extended (SEX) |
| 04 | 0 | 1 | 1 | 0 | 0 | 0 | Constant (CON) |
| 05 | 0 | 0 | 1 | 1 | 0 | 0 | Zeros (Z) |
| 06 | 0 | 0 | 1 | 0 | 0 | 0 | Instruct. reg. source (IRS) |
| 07 | 0 | 0 | 1 | 0 | 0 | 1 | Lower byte (LBY) |
| 12 | 1 | 0 | 0 | 0 | 0 | 0 | Program load (PL) |
| 14 | 0 | 1 | 1 | 0 | 0 | 0 | Trap (TRP) |
| 15 | 0 | 0 | 1 | 1 | 0 | 0 | Bits (BIT) |
| 16 | 0 | 0 | 1 | 0 | 0 | 0 | Instruction reg. dest. (IRD) |
| 17 | 0 | 0 | 0 | 0 | 1 | 1 | A Reg. (AR) |

The next $\overline{R\,BUF\,4\text{-}7}$ bits define the A REG (A register) output, and together with the $\overline{IR\,1\text{-}4}$ bits are connected to an A-port multiplexer 152 for generating address signals $\overline{A\,ADR\,0,1,2}$ for the A register to specify which of the eight registers appears on the A port of the dual port register file. The B REG (B register) output field is defined by $\overline{R\,BUF\,8\text{-}11}$ bits which together with $\overline{IR\,1\text{-}4}$ bits are supplied to a B port multiplexer 153 for providing address signals $\overline{B\,ADR\,0,1,2}$ to the B register, which signals together with $\overline{LD\,MEM\,PORT}$ are coupled to a C port multiplexer 154 for addressing the C register with addresses $\overline{C\,ADR\,0,1,2}$. The B port multiplexer output addresses one of the eight registers to the B input of the ALU, which registers include ACO-AC3, GRO-GR2 and PC. A signal from the RAND 2 decoder 161 also determines the state of EN B OUT for control of memory bus connections as discussed previously. The ALU field is defined by $\overline{R\,BUF\,12\text{-}15}$ bits, which are fed to an ALU control ROM 155 for controlling the ALU to perform arithmetic and logic functions. The map shown below in Table IV of the read only memory 155, depicts the bit value outputs of the ALU control given the octal address, representative of the octal contents specified, whereby the octal address is determined by the following bits proceeding from right to left $\overline{R\,BUF\,15,14,13,12}$ and ground in a low condition.

TABLE IV

| OCTAL ADDRESS | ROM CRY | ALU | | | | LOGIC MODE | LOGIC OCTAL | CONTENT |
|---|---|---|---|---|---|---|---|---|
| | | S0 | S1 | S2 | S3 | | | |
| 00 | | 0 | 1 | 1 | 1 | 0 | 1 | $\overline{A\,o\,B}$ |
| 01 | | 1 | 1 | 1 | 0 | 0 | 1 | $\overline{A}\,o\,B$ |

TABLE IV-continued

| OCTAL ADDRESS | ROM CRY | ALU S0 | S1 | S2 | S3 | LOGIC MODE | LOGIC OCTAL | CONTENT |
|---|---|---|---|---|---|---|---|---|
| 02 | | 0 | 1 | 0 | 0 | 0 | 1 | $A \circ \overline{B}$ |
| 04 | | 0 | 1 | 1 | 0 | 0 | 1 | $A \times OB$ |
| 05 | | 0 | 0 | 1 | 0 | 0 | 1 | $A \underline{0} A$ |
| 06 | | 1 | 1 | 1 | 1 | 0 | 1 | $\overline{A}$ |
| 07 | 1 | 1 | 0 | 0 | 1 | 1 | 0 | $A - B$ |
| 10 | 1 | 0 | 1 | 1 | 0 | 1 | 0 | $A + B + 1$ |
| 11 | 1 | 1 | 1 | 0 | 0 | 1 | 0 | $A + A + 1$ |
| 12 | 0 | 1 | 1 | 0 | 0 | 1 | 0 | $A + A$ |
| 13 | 0 | 1 | 1 | 1 | 1 | 1 | 0 | $A - 1$ |
| 14 | 0 | 1 | 0 | 0 | 1 | 1 | 0 | $A + B$ |
| 15 | 1 | 0 | 0 | 0 | 0 | 1 | 0 | $A + 1$ |
| 16 | 0 | 0 | 1 | 1 | 0 | 1 | 0 | $A + B$ |
| 17 | 0 | 0 | 0 | 0 | 0 | 1 | 0 | $A$ |

The next four bits R BUF 16-19 define the SHIFT field which controls both the shifting performed on the adder output and the insertion of data into bits zero and fifteen of the shifter. For micro-instructions whose carry control field is not ALC, the shift multiplexer 156 causes $\overline{SH\ SEL\ 0,1}$ signals to be derived from $\overline{R\ BUF}$ 16,17 bits which control the operation of the shifter, shown in FIG. 4, to be a group of eight, four input multiplexers which swap, shift right, shift left, or leave unshifted the adder output. The CRY EN (carry enable) signal input here may or may not be the compliment of the base value of the carry.

The straight right and left shift modes are further subdivided by $\overline{R\ BUF}$ 18,19 bits that determine what happens to the end bits. For straight shifting, bit zero of the shifter output in FIG. 4 comes from a $\overline{ST\ RT\ IN}$. For right shifts, bit zero of the shifter output comes from $\overline{RIGHT\ IN}$. For left shifts, bit fifteen of the shifter comes from $\overline{LEFT\ IN}$. For micro-instructions whose carry control field is ALC, the shift multiplexer 156 derives SH SEL 0,1 from the shift field bits $\overline{IR\ 8,9}$ of the ALC instruction.

The load field which is defined by $\overline{R\ BUF\ 20}$ bit controls the loading of the selected A-input port register from the shifter output. The $\overline{R\ BUF\ 20}$ input to the shift multiplexer 156 allows LOAD A0-A11 to be derived when the ALC field is low. When ALC is high, on the other hand, loading of the A port registers is under control of IR 12, the load control field of the ALC instruction. In such an operation, LOAD Aφ-11 causes LOAD A12-15 to automatically go low. Together LOAD Aφ11 and LOAD A12-15 low, enable the writing of the A-input of the two port registers into the selected A register.

The CRY (carry) field which is defined by R BUF 21,22 bits controls the carry which is a single bit. The two bits 21,22 are connected to the carry multiplexer 157. The carry control field, bits 21,22 can set, reset (clear), preserve the carry, or it can delegate carry control to the ALC carry hardware. The base value (an intermediate calculation for determination of carry) is determined by the ALC's carry control field defined by IR10, 11 bits. It then compliments this base under control of the ALC's instructions shift control field, IR8,9, the resultant carry and ALU output are shifted. It then compliments this base value if there is a carry out of the adder. Under control of the ALC's instruction's shift control field, IR8,9, the resultant carry and ALU output are shifted. The no load bit IR 12 to the carry multiplexer can inhibit final loading of the carry. This mux accomplishes the set, reset and no change functions by selectively connecting $\overline{SET\ CRY}$, the output of the carry multiplexer 157 to ground, a positive voltage, or $\overline{CARRY}$. For example, given a carry control field selection of ALC and a low on $\overline{IR\ 12}$, the no load bit $\overline{SET\ CRY}$ is connected to $\overline{CARRY}$.

The MA (memory address load) field defined by the $\overline{BUF\ 23}$ bit, is used to communicate with memory to load the memory address register from the output of the ALU. A zero indicates a no load or do not load memory with the output of the ALU. With a one condition, a load is called for. The MC (memory control) field defined by $\overline{R\ BUF\ 24,25}$ bits generates one of four signals for controlling reading (or writing) from (or to) the last memory location in a memory location in a memory address register. The first is a no read or write. The second, is a RMOD (read and modify) which can only occur in the next micro-instruction after an MA load. It operates exactly like a READ, however, in the following micro-instruction, one may say WRITE. A third is WRITE and a fourth is READ.

The next micro-instruction field is defined as RAND 1 (random 1) involving $\overline{R\ BUF\ 26-28}$ bits connected to a RAND 1 decoder 158, which operates to do various unrelated random functions around the CPU and do not simply control some data path or multiplexer like the ALU. A second input to the RAND 1 decoder 158 is a NAND gate 159 supplied with two signals, $\overline{LD\ SUB}$ (load subroutine) and a data timing signal. The first four RAND 1 fields, defined by bits 26-28, serve as both randoms and as μ JSR register specifiers. When the State Change field, to be discussed hereinafter, is supplied with a JMPSR or RETSAV bit configuration, the seven random output functions shown from the RAND 1 decoder are disabled and the bits 27,28 determine which of the four μ JSR registers receives the current page in the address in the false address field, as will be discussed. The three bits 26-28 otherwise define one of a series of signal inputs to generate the output signals; $\overline{DCH\ EN}$ defining a data channel break enable; $\overline{SCND}$ defining save conditions, ie. setting or clearing flip flops; IOTR defining I/O transfer enable; FPDA defining floating point data; CNDA defining console data enable to connect the data switches to the MEM bus, and; STIR defining store to instruction register from the MEM bus. This latter signal, STIR, enables a future DEC 1 or DEC 2 signal to cause a branch to a different section of micro-code, as will be discussed. For example, if a JMP instruction is put into the IR and the effective address (IR bits 6-15) is placed in GR0, then after entering the defer code section any micro-instruction can decode into the jump routine.

The next micro-instruction field is the RAND 2 field defined by R BUF 29-31 bits which are connected to a RAND 2 decoder 161. Eight input signal configurations generated as a consequence of the three input bits include: B MEM specifies the B port register as the register to receive a read from memory DEC LD defined as a decimal load; LCNT defined as a load counter to load the four bit counter from the ALU; IOFF defined as ION-OFF for disabling interrupts; CNIN defined as console instruction for connecting and encoding of the pressed console switch of the MEM bus, and; RSTR defined as a select writing of memory bus in the CPU.

The State Change control field is defined by R BUF 32-27 bits. The main purpose of the State Change field is to test the specific conditions to select the next microcode word based on either the true or false fields in the micro-instruction word. The R BUF 33,34 bits are connected to a Page and Group decoder 163, for selecting which of the four groups of integrated chips are to be used for testing purposes, whereas the RA 0,1 signals are connected to the Page and Group decoder to determine which of the four pages of the ROM's is to be selected. R BUF 35,36,37 bits are fed to a test multiplexer 164, along with the indication of which group 0,1,2, or 3 has been selected. Depending on which of the four groups a selection via bits 35,36,37 is made, a signal RASEL (RA Select) is passed through the multiplexer 164 for indicating whether or not the true or false address field is the one to be selected for addressing the next micro-instruction. These 32 tests provided for reside in state changes in addition to the microbranching capability provided by the first eight state changes.

The first eight state changes reside in the special class detected by state change ROM 165 which alters microprogram flow without a test. The micro-instruction in these special eight state changes, is selected based on either the instruction register, the μ JSR registers, or the true address field. Shown below, is a Table V for the eight state changes in the state change read only memory 165 where the octal address is determined by R BUF 33-37 bits, read in a right to left manner. R BUF 32 bit or the inverted R BUF 32 bit is used for enabling the state change ROM. The octal content is a definition of what the octal address represents and given any one of these addresses, the output signals shown will be generated with the designated bit values for that octal input content.

execution of the instruction. From here, control is transferred to the appropriate micro-code address.

The DEC 1 is a decode 1 which causes a decoding of the instruction register to enable each instruction to access an address to which DEC 1 transfers control. This is used to effect access to micro-code microinstructions common to several computer instructions or from the phantom location to the appropriate microcode address. DEC 2 is a decode 2, similar to DEC 1 except that it permits access to a second group of addresses which can be different from the DEC 1 address.

JMPSR is a jump sub-routine involving a jump made to the micro-instruction given in the ten bit true address field. The current page, ROM bits 38,39, and the false address, ROM bits 48-56, are loaded into the μ JSR register specified by RAND 1.

RTRN transfers control to the micro-instruction whose address (10 bits) is in the μ JSR register specified by ROM bits 38,39, so that the page field selects the μ JSR register. JUMP transfers control to the microinstruction whose ten bit address is in the true address field.

RETSAV is a return and save false address field, whereby control is transferred to the micro-instruction whose address (10 bits) is in the μ JSR register specified by ROM bits 38,39. That is, the true address page field selects the μ JSR register. The current page and the false address, R BUF 38,39 and 47-56 bits are then loaded into the μ JSR register specified by RAND 1.

NILDIR is a no interrupt load IR, the same as load IR except pending interrupts are not allowed to defer the loading of the instruction register.

With respect to the True and False address field, respectively defined by R BUF 40-47 bits and 48-55 bits, these bits are utilized for addressing a full page of read only memory locations. Clearly each of these addresses allows 256 words. Since there are four read only memories, a total of ten hundred and twenty-four micro-instructions can be addressed. The ten bit true address which includes the page field, directly addresses all four pages of the ROM. The current page is the page from which the last micro-instruction was fetched. The false address field, which is eight bits wide, always implies the current page. The true address field is also utilized as a constant, as will be discussed hereinafter.

Timing and Memory Signals

TABLE V

| OCTAL ADDRESS | LDIR ENAB | ACS SEL φ | ACS SEL 1 | DEC CNT | RETURN | LD SUB | DECODE 2 | DECODE ENAB | OCTAL CONTENTS |
|---|---|---|---|---|---|---|---|---|---|
| 70 | 0 | 0 | 0 | 0 | 0 | 0 | 0 | 0 | NILDIR |
| 71 | 0 | 0 | 0 | 0 | 0 | 1 | 1 | 0 | RETSAV |
| 72 | 0 | 0 | 0 | 0 | 0 | 0 | 0 | 0 | JMP |
| 73 | 0 | 0 | 0 | 0 | 1 | 0 | 0 | 0 | RTRN |
| 74 | 0 | 0 | 0 | 0 | 0 | 1 | 0 | 0 | JMPSR |
| 75 | 0 | 0 | 0 | 0 | 0 | 0 | 1 | 1 | DEC 2 |
| 76 | 0 | 0 | 0 | 0 | 0 | 0 | 0 | 1 | DEC 1 |
| 77 | 1 | 0 | 1 | 0 | 0 | 0 | 0 | 0 | LD IR |

Figure 16:
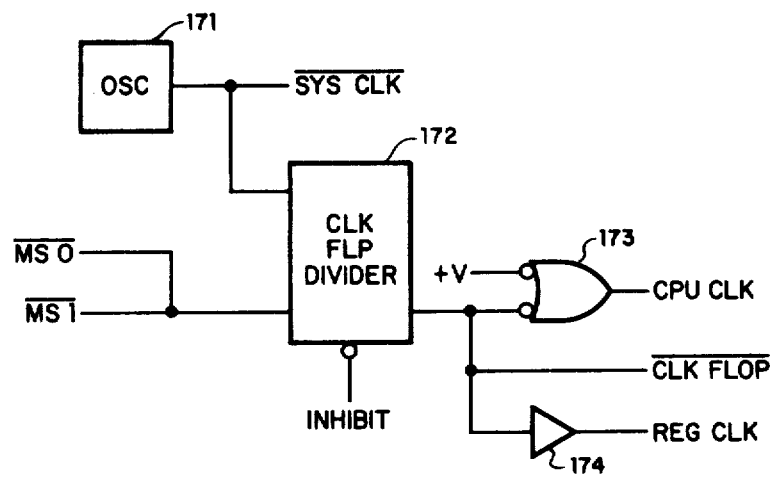
FIG. 16 is a schematic block diagram of circuitry 67 in FIG. 1 for generating timing signals.

To briefly review the octal content designation: LDIR calls for loading of the instruction register from the MEM bus and results in a phantom micro-instruction being derived from the MEM bus and executed. The GR0 register will contain a copy of the MEM bus or an address if the MEM bus instruction involves an effective address calculation. As was earlier discussed, the phantom micro-instruction, generated as a function of the instruction on the MEM bus is the first step in the With reference to FIG. 16, there is shown a block diagram of some of the more significant signals of timing circuitry 67 shown in FIG. 1. A master oscillator 171 provides the master frequency upon which the entire computer system is based and is defined as SYS CLK which is the master timing reference for the processor and memories. In the particular embodiment disclosed, SYS CLK has a 100 nanosecond period and never stops. The SYS CLK signal together with MS0

AND $\overline{MS1}$ signals are connected to a clock flop divider circuit 172 which performs a divider function to divide SYS CLK to form a 200 nonosecond period defined as $\overline{CLK\ FLOP}$, which can be synchronously held high be either $\overline{MS0}$ or $\overline{MS1}$ low for suspending processor operations until a number of requests are satisfied. The latter signals being generally busy signals generated by the memory which are discussed in detail in applicant's co-pending application, U.S. Pat. App. Ser. No. 509,183, filed Sept. 25, 1974, now U.S. Pat. No. 3,931,613.

The signal $\overline{CPU\ CLK}$ derived from gate 173 is merely an inverted copy of $\overline{CLK\ FLOP}$ which can be held high by simple signals, e.g. $\overline{STOP\ CPU}$ which is indicative for data channel referencing memory. It is on the rising edge of REG CLOCK that the memory data reception registers on the computer (e.g. CRφ) are clocked at the same time. At this time, a new microcode word which is clocked into the ROM buffer assumes control. REG CLOCK which is derived by way of inverter 174 to be an inverted copy of the $\overline{CLK\ FLOP}$ is not stopped by $\overline{STOP\ CPU}$. Like $\overline{CPU\ CLK}$, REG CLK has a 200 nonosecond period.

Figure 17:
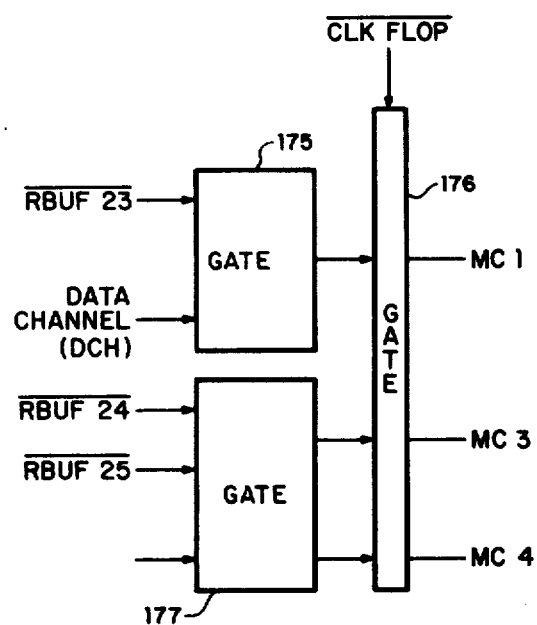
FIG. 17 is a schematic block diagram circuitry for generating memory signals.

Turning to FIG. 17, there is shown a first gate circuit 175 having inputs $\overline{R\ BUF\ 23}$ which is the "MA LOAD" specifier, which together with a data channel signal will provide a signal MC1 when gate 176 is enabled by $\overline{CLK\ FLOP}$. The data channel information to gate 175 specifies that the data channel wants to talk to the memory and DCH signals ar used to accomplish data transfer functions by putting data on the MEM BUS or for receiving data from the MEM BUS. In a similar fashion, the gate 177 responds to various selections of data channel signals and R BUF 24, R BUF 25 signals to generate signals MC3 and MC4, R BUF 24, R BUF 25 being the memory control field bits for controlling reading (or writing) from (or to) the last memory location in a memory address register.

The origin of memory control signals MC1, MC3, MC4 lies in the micro-code defined by $\overline{R\ BUF\ 23, 24}$ and 25 bits for communication with memory. It is illustrated in FIG. 17 that these bits are gated with $\overline{CLK\ FLOP}$ to produce the memory control signals MC1, MC3 and MC4, which means that with the exception of the data channel case, memory control signals may go low 100 nanoseconds into the micro-instruction. $\overline{MC1}$ starts a memory module by giving it an address. $\overline{MC3}$ is a WRITE plus DONE whereby the data on the MEM BUS is written into the previous address location. MC4 causes a READ plus WAIT which is used for a read modify write to make the reading and altering of the memory location as fast as possible. $\overline{MC3}\cdot\overline{MC4}$ causes a READ plus DONE which is used for a read which is followed by a rewrite which restores the cores after a destructive readout.

Assume that a micro-instruction is reading a memory word for a previously specified memory address and also loading a new memory address for a read to be done in the next micro-instruction. The "MA LOAD" is specified with a one bit in the memory address control field. This bit causes $\overline{MC1}$ to go low at 100 nanoseconds into the micro-instruction. The "READ" similarly causes $\overline{MC3}$ and $\overline{MC4}$ to go low 100 nonoseconds into the micro-instruction. On the rising edge of the next REG CLK, the CPU register which receives the memory word will be clocked and the memory address will cease to be on the address bus. Therefore, if the memory does not have the word ready on the memory bus, it drops $\overline{MS1}$ low. If it cannot accept the address, it drops $\overline{MS0}$ low. Either case will synchronously stop $\overline{CPU\ CLK}$ and $\overline{REG\ CLK}$ holding them low.

As memory timing is derived from SYS CLK, memory continues its cycle. At some point, it finishes the "READ" and $\overline{MS0}$ and $\overline{MS1}$ will go high. The memory now accepts the new address and read clock clocks the data from the MEM BUS into one of the CPU registers.

Writable Control Store

As will become apparent, the present invention by virtue of its architecture, allows a computer instruction to be effected in firmware through the micro-code, as opposed to software, where an additional control store of micro-instruction words, frequently referred to as writeable control store (WCS), is implemented. WCS enables a user to implement his own instruction set in micro-code. Overall speed is achieved in this manner by tailoring a machine's instruction set to its application.

Figure 18:
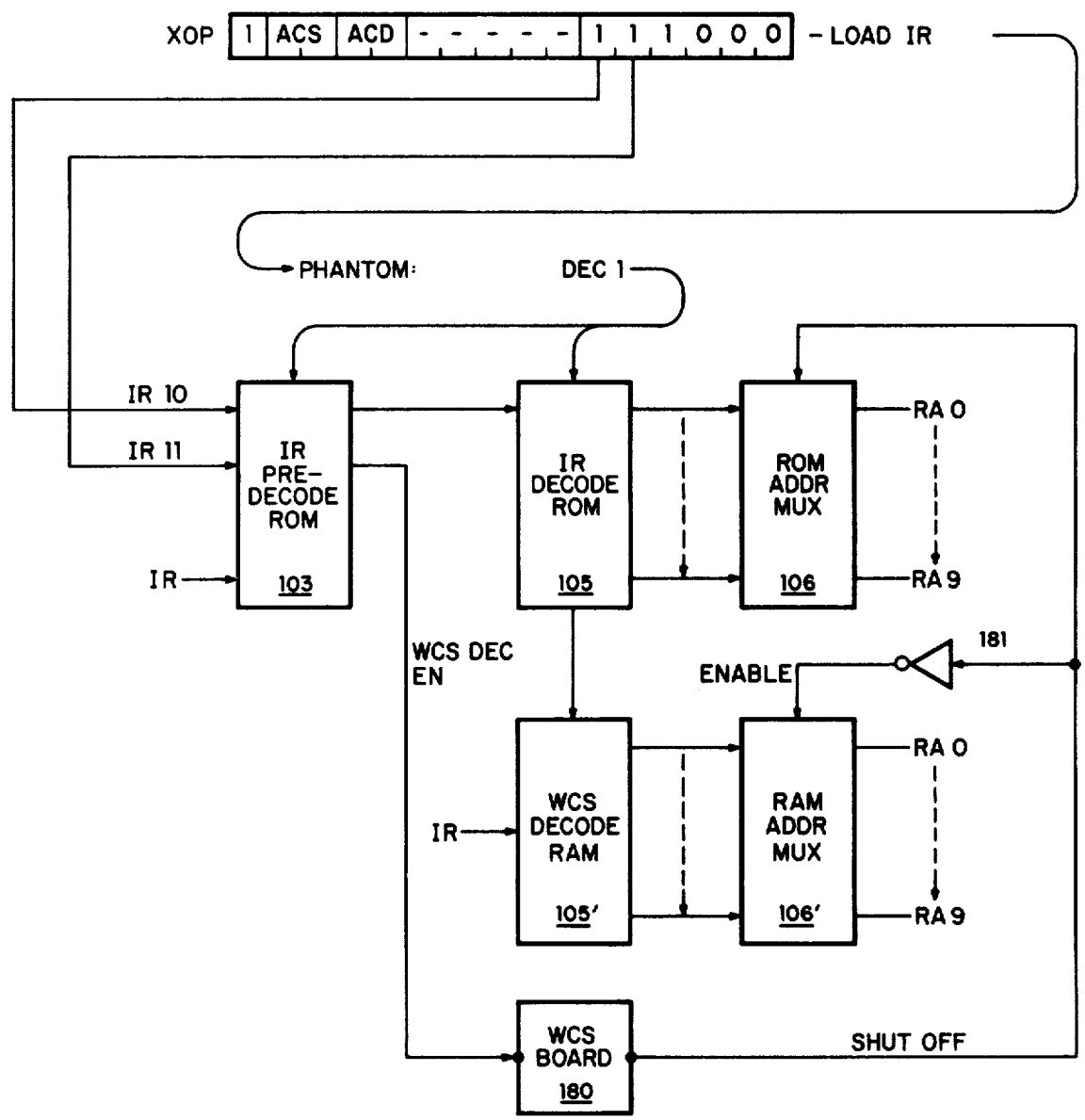
FIG. 18 is a schematic block diagram illustrating the WCS compatibility with flow diagrams illustrating signal connections to portions of the hardware.

With reference to FIG. 18, there is shown the IR predecode ROM 103, the IR decode ROM 105 and ROM ADR MUX 106 previously shown with reference to FIGS. 6 and 7. As is illustrated, there is additionally shown a WCS decode RAM 105' and RAM ADR MUX 106' which are similar in function and operation to the IR decode ROM 105 and ROM ADR MUX 106, except that the former is hardware utilized for a WCS board having a WCS control store of micro-instructions. WCS decode RAM 105' provides a means of decoding to the proper entry point in micro-code. The decode RAM's are 4 bit by 16 bit word access memories with a read enable and write enable. They are organized into 64 eight bit words, thirty-two DEC 1 and thirty-two DEC 2 storage locations. RAM ADR MUX 106' allows micro-code words, programmed by the user, to be clocked into the ROM buffer to control the computer. The WCS control store of micro-instructions is one of the additional three pages of micro-code earlier referred to with reference to ROM's 107 in FIG. 7b.

In the particular embodiment, the WCS would be a 256 by 56 bit words of semiconductor memory having specialized instructions implemented by the user. The 56 bit words contain instructions for controlling the elementary data paths of the computer. WCS would involve a separate WCS board illustrated as 180 in the particular embodiment which would normally be inserted in the computer mainframe. The output from the WCS board 180 is connected to each the ROM ADR MUX 106 and the ROM ADR MUX 106', the output signal normally being a shut-off signal which when inverted by the inverter 181 will become an enable signal.

Without WCS hardware, with the illustrated XOP computer instruction having IR bits 10, 11 in either a 1-φ and 1—1 state, bits 6–10 designate two sets of 32 addresses (through IR bits 5–9) in the core for addressing memory locations to software instructions which have been inserted by the user in core. A phantom, as earlier discussed, is generated as a consequence of LDIR to do this XOP instruction. The phantom increments PC, loads MA and does a DEC 1, using the micro-code to fetch the contents of a specific location in core, the address of which is added to the number extracted from the IR bits and this address is then used to fetch from a table the address of the user's software routine in core. In operation with IR bits 10 in a 1—1 or 1-φ configuration, the signal WCS DEC EN leads to nowhere without a WCS logic 180 inserted within the computer mainframe. Accordingly, the IR decode ROM 105, enabled by DEC 1, operates as previously indicated to provide a set of signals to the ROM ADR MUX 106 which addresses the first page of ROM micro-instructions addressed by RAφ–RA9.

With the WCS logic 180 inserted within the computer mainframe, however, IR bits 10 and 11 having a 1—1 configuration cause the WCS DEC EN signal to be generated and passed to the WCS logic. At the same time, WCS DEC RAM 105' will be enabled by the DEC 1 relevant micro-instruction field. The WCS logic in turn, generates a shut-off signal which disables the ROM ADR MUX 106 and by way of inverter 181 enables RAM ADR MUX 106' to, in turn, generate a set of signals RAφ–RA9 for addressing the control store containing the WCS micro-instructions.

Even with the WCS logic included, an IR bit 10 and 11 configuration of 1—1 still permits accomplishing an instruction is software, if desired.

Accordingly, with the above architecture, one has the selective ability of doing an instruction in software or hardware, the capability of being extended to include hardware by the mere insertion of WCS logic within the computer mainframe.

Operation

The working of some significant aspects of the operation not previously discussed, in accordance with the preferred embodiments of the present invention, may be best explained with reference to FIGS. 12–15 showing flow diagrams.

Figure 12:
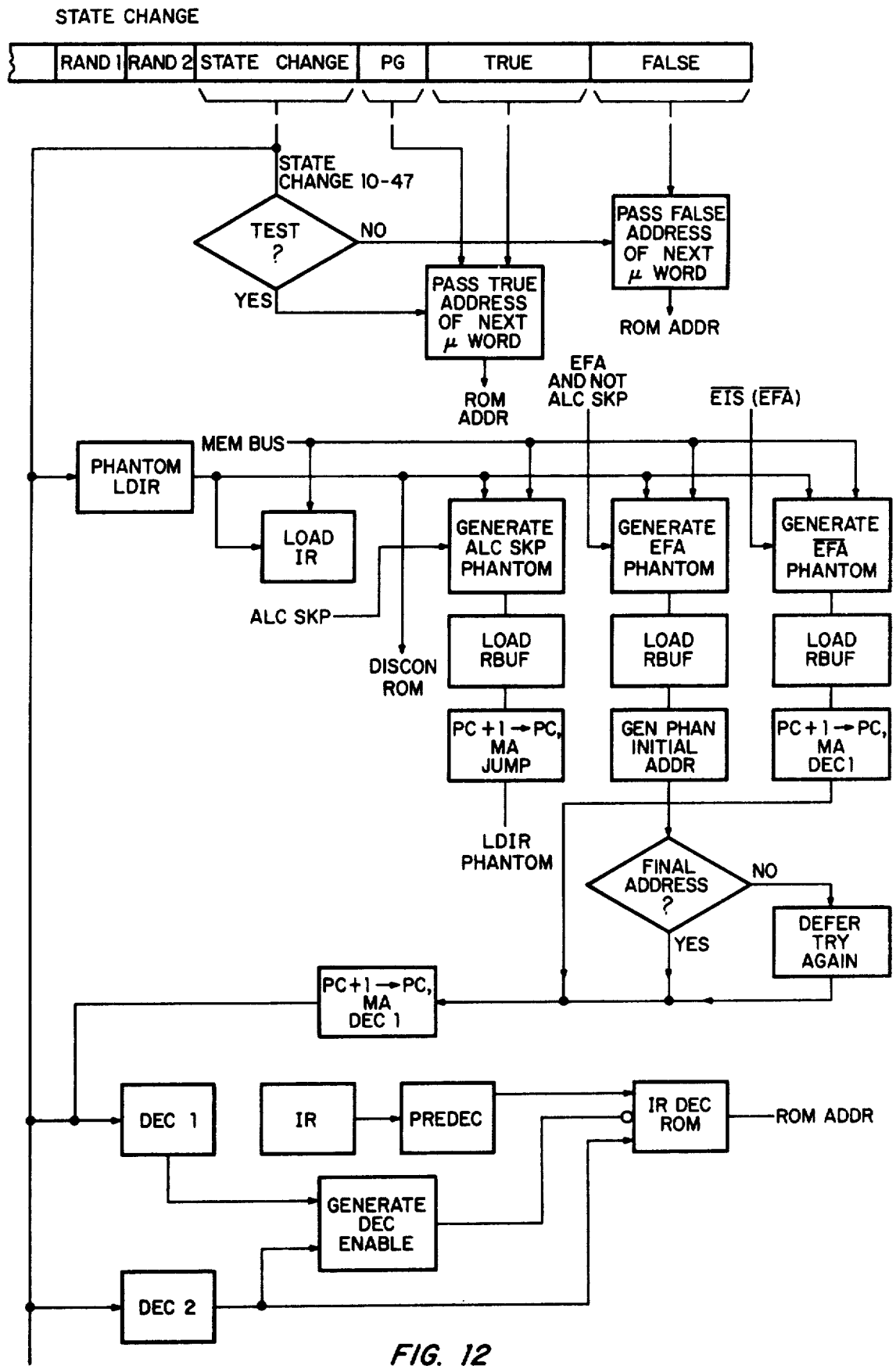
FIGS. 12-15 are flow diagrams disclosing some detailed and more significant aspects of the present invention.

When a micro-instruction to load IR from memory is called for during the end of a current microprogram, as depicted in FIG. 12 at the CPU clock time, an LDIR state change will be detected thereby disabling the ROM's 107 and enabling the phantom logic 112 via gate 112', as shown in FIG. 5, to cause a loading of the instruction register from the memory bus and at the same time a loading of a phantom onto the R Buffer from selected lines on the memory bus. During the loading of a phantom, the ROM output is disconnected. It should be noted that running examine, interrupe or halt ROM micro-instruction is addressed in the event that the LDIR is deferred. Then, in that case, the ROM output is not disconnected and the phantom is inhibited. As is illustrated, one of three type phantoms may be generated, this being conditioned on the input signals ALC SKIP, EFA, and EFA. The conditions of the ROM Buffer for any one of these selected phantoms generated is shown on the following page in Table VI, which shows six phantoms to be available.

The first type of phantom is number one in Table IV which is caused by an ALC SKIP low signal in the current computer instruction (see Table II) which generates a phantom micro-instruction that will increment the program counter PC by one, load the memory address register with PC, and transfer control to micro-code GIRL which reloads the instruction register to accomplish the skip.

The second type of phantom is listed as number six in Table VI which is an EFA phantom. In this case, the program counter is similarly incremented and loaded into memory, however, a DEC (decode) 1 present in the state change field is detected to cause a decoding of selected IR bits during the next clock pulse to access an address to which DEC 1 transfers control.

The third type of phantom involves the second through fifth, four EFA and not ALC skip phantoms each having a different address operation. For example, in one case GRφ, as modified by SEX (sign extended) on the A-input line, is added to PC and loaded into memory. This occurs with program flow alteration by instructions such as: jump, jump to subroutine, increment and skip if zero; decrement and skip if zero; load, and; store. In each case, the address generated may or may not be the address of an address or the final (effective) address itself. This is determined by the state test IR5BDI. If the fifth bit of the instruction register is one, then the false address is the address selected, which is deferred to indicate that it is the address of an address. If, on the other hand, the IR5 text reveals a zero, then DI suggests a decode 1 to be effected as this is the final address.

As is shown in a DEC 1 state change test, the ROM bits 32–37 alter microprogram flow thus providing microbranching without a test, causing a decoding of selected bits of the IR to enable the instruction OP-CODE to access an address to which DEC 1 transfers control. FIG. 12 further depicts that DEC 1 signals, as well as DEC 2 signals, are coupled to generate the signal DEC EN (decode enable) and DEC 2 signals which are routed directly to the IR decode ROM. A DEC EN will indicate a decode 1 at the IR decode ROM, whereas DEC 2 will indicate a decode 2 capability at the IR decode ROM. As was previously indicated, decode 2 is like decode 1, except that it permits access to a second group of addresses which can be different from decode 1 address.

Figure 13A:
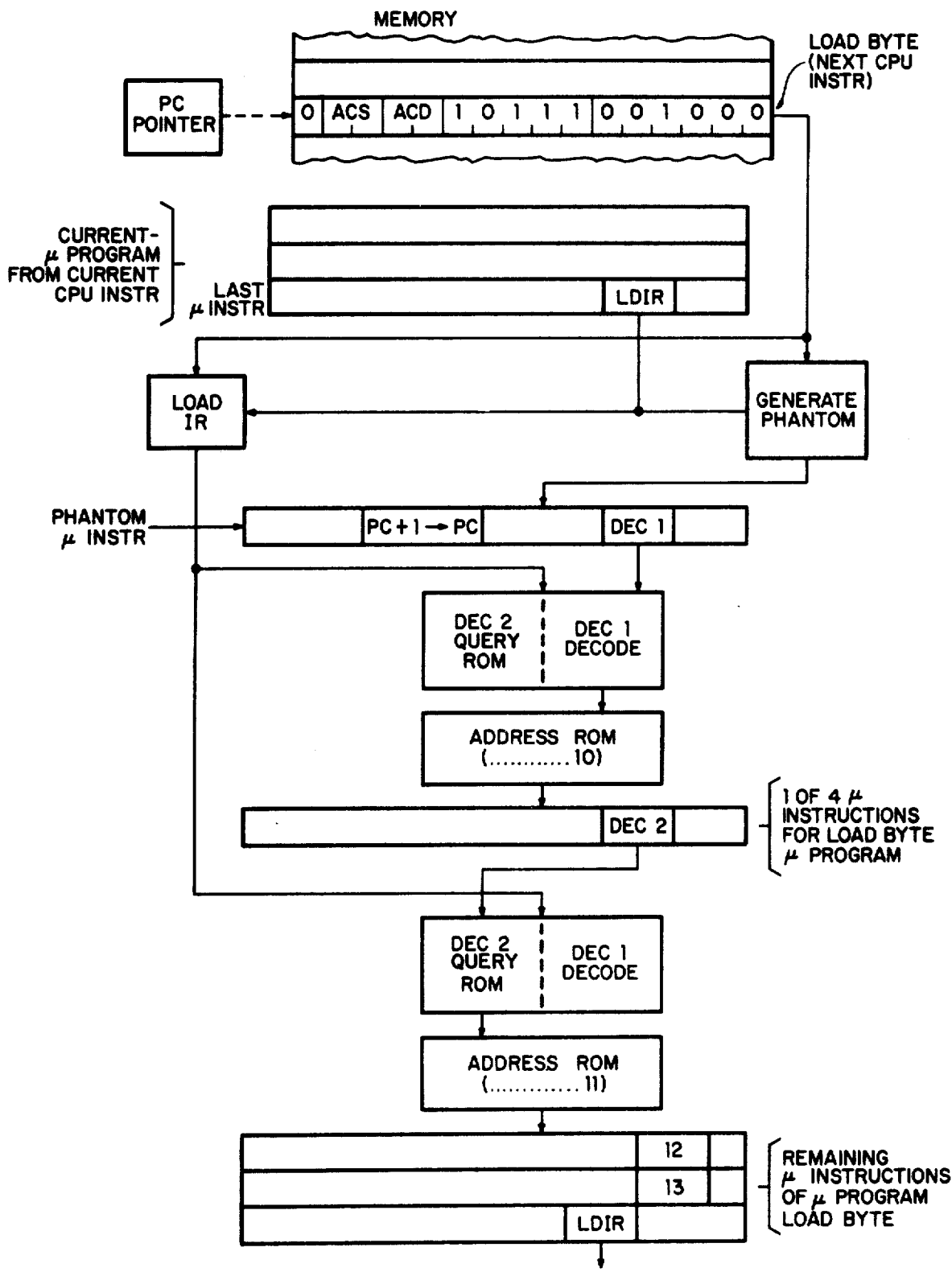

The advantages of a DEC 1 and DEC 2 decode capabilities may be readily observed with reference to FIG. 13a wherein there is shown a flow diagram where a program counter points to a next CPU instruction in memory while a current CPU instruction is being implemented by a current microprogram, the last instruction of which specifies a LDIR which causes the phantom to be generated and simultaneously load the IR with the next CPU instruction. The phantom micro-instruction which is generated from the MEM bus with selective bits of the next CPU instruction covers the program counter to be incremented to point to the following computer instruction. In addition, the phantom additionally allows a decode 1 to be generated, which provides an address to the decode ROM from a first group of signals derived from the instruction register. We

TABLE VI

| | A INPUT | A | B | ALU | SH | L | CRY | MA | MC | RAN1 | RAN2 | TEST | T | F |
|---|---|---|---|---|---|---|---|---|---|---|---|---|---|---|
| | | | | | | PHANTOM SIGNALS | | | | | | | | |
| 1) | AR | PC | φ | A₁ | Fφ | L | N | L | N | N | N | JUMP | GIRL | DEFER |
| 2) | LYB | GRφ | φ | A | Fφ | L | N | L | N | N | N | IR5BDI | GIRL | DEFER |
| 3) | SEX | GRφ | PC | A + D | Fφ | L | N | L | N | N | N | IR5BDI | GIRL | DEFER |
| 4) | SEX | GRφ | AC₂ | APB | Fφ | L | N | L | N | N | N | IR5BDI | GIRL | DEFER |
| 5) | SEX | GRφ | AC₃ | APB | Fφ | L | N | L | N | N | N | IR5BDI | GIRL | DEFER |
| 6) | AR | PC | φ | A₁ | Fφ | L | N | L | N | N | N | DEC1 | | | assume now that this instruction called for is a Load Byte which has a microprogram that includes one microinstruction (address—1φ) which is common to at least one other microprogram (e.g. Store Byte). For that common portion of the microprogram or the first micro-instruction after the phantom, this will be generated by the decode 1 capability whereby the micro-instruction will include a decode 2 built into its state change field, to cause a decoding of a second group of signals from the mux to provide the three remaining micro-instructions which are a part of the Load Byte microprogram. At the end of a decode 2, a decode 1 or another decode 2 can again be jumped to. In this instance, however, an LDIR is called for whereby a phantom is again generated for loading the instruction register and setting the program counter.

The actual bit content, in octal, for such microinstruction of the Load Byte microprogram is shown in FIG. 13b. For the phantom micro-instruction, the program counter PC of the A register is the register at the A-input, which content is added to one at the ALU and straight shifted (Fφ) through the Shifter to be loaded back in the A register PC, thus PC+1→PC. Although the memory address (MA) register is also designated to be loaded with the output of the Adder, it is in fact inhibited in hardware. The state change test calls for a DEC 1 which may be seen with reference to Table VI on page 33 where an octal value 76 (DEC 1) for R BUF 33-37 bits provides a DECODE ENABLE.

The next micro-instruction (address—1φ) has zeros (Z) at the A-input, the A register being GRφ and the B register the ACS with the byte pointer bit, the right most bit of ACS. Since the A-input has zeros, ACS passes through the Adder through the ALU and a one bit right shift in the Shifter is effected to get rid of the byte pointer and then the resultant word pointer is loaded (L) into GRφ. Note that the byte pointer is retained in the LINK bit. The DEC 2 for page zero (ZX) of the ROM is designated by the octal value 75 which at Table V at page 33 which for a Load Byte designates micro-instruction (address—11) LDBB is a DEC 2.

In the LDBB micro-instruction, the A-input is the A register with the A register GRφ and the B register "don't care" (X), whereby the A register content is put through the Adder and the MA is loaded with the word pointer and the Q-bit test designated the micro-instruction MHOB (address—12). At the micro-instruction MHOB, the A-input is the A register again with the A register PC, and the B register having ACD. The A register content is put through the Adder and straight through the Shifter (FO) and set into PC and MA is loaded. Concurrently, a READ from memory loads ACD with the word pointer. The LINK is tested to designate whether upper or lower byte is desired. If lower byte designated, at the micro-instruction LLBY (address—13) the lower byte LBY of ACD is put straight through the Adder and reloaded into ACS. The operation of LOAD BYTE is accomplished. A read of the next memory instruction accompanied by LDIR commences the sequence of the next instruction.

If the LINK test designated the lower byte LUBY micro-instruction (address—14), then LUBY put in the ROM buffer. This micro-instruction passes the uper byte of ACD through the Adder, swaps the Adder output and loads this into ACD. A read of the next memory instruction accompanied by LDIR commences the sequence of the next instruction.

Figure 14:
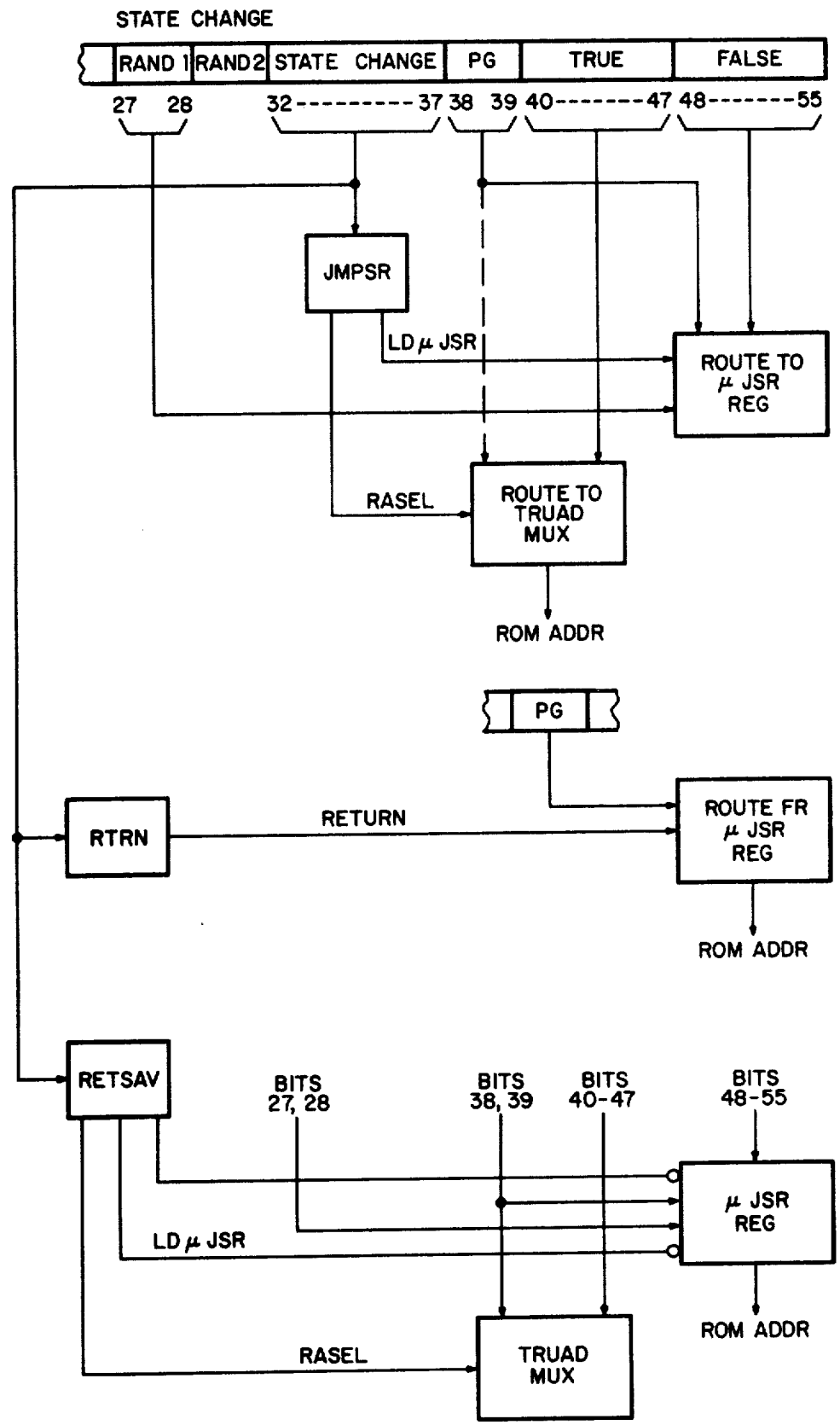

With reference to FIG. 14, there is first shown a JMPSR state change detection wherein the R BUF 40-47 bits are routed to the truad multiplexer and passed together with R BUF 38, 39 bits by a RASEL signal, which latter bits determine the ROM page being addressed. The current page determined by ROM bits 38,39, as well as the false address determined by R BUF 48-55 bits ae routed to the μJSR register, at least that one determined by R BUF 27,28 bits from the RAND 1 field. As may be evident, this capability allows return of control to an earlier micro-instruction whose address in one of the μJSR registers, at a later time. This capability is realized from the RTRN detection of a state change which together with the page field bit 28,29, specify the μJSR register in which the ten bit address lies for the return. A RETSAV change detection allows a return and at the same time the saving of the current false address field. The new address page field selects the μJSR register which address is to be returned and then the μJSR register which address is to be returned and then the current page in the false address involving R BUF 38,39 and 47-56 bits are then loaded into the μJSR register specified by RAND 1.

For the first eight state changes which provide for altering micro-code flow without a test, shown below there is a Table VII for the state change read only memory 165 where the octal address is determined by R BUF 33-37 bits when read in a right to left manner. The inverted R BUF 32 bit is used for enabling the state change ROM. The octal content is a definition of what the octal address represents. Given any one of these addresses, the output signals as shown will be generated with the designated bit values represented for that octal content.

TABLE VII

| OCTAL ADR | LDIR EN | ACS SEL φ | ACS SEL 1 | DEC CNT | RETURN | LD SUB | DEC 2 | DEC EN | OCTAL CONTENTS |
|---|---|---|---|---|---|---|---|---|---|
| 30 | 0 | 0 | 0 | 0 | 0 | 0 | 0 | 0 | NILDIR |
| 31 | 0 | 0 | 0 | 0 | 1 | 1 | 0 | 0 | RTRNSR |
| 32 | 0 | 0 | 0 | 0 | 0 | 0 | 0 | 0 | JMP |
| 33 | 0 | 0 | 0 | 0 | 1 | 0 | 0 | 0 | RETURN |
| 34 | 0 | 0 | 0 | 0 | 0 | 1 | 0 | 0 | JSR |
| 35 | 0 | 0 | 0 | 0 | 0 | 0 | 1 | 1 | DEC 2 |
| 36 | 0 | 0 | 0 | 0 | 0 | 0 | 0 | 0 | DEC 1 |
| 37 | 1 | 0 | 1 | 0 | 0 | 0 | 0 | 0 | LD IR |

In briefly reviewing the octal content designations, LDIR calls for loading of the instruction register from the memory bus whereby a phantom micro-code instruction is generated as a function of the instruction on the memory bus and executed. GRφ will contain a copy of the MEM bus. From here, control is transferred to the appropriate microprogram address. The DEC 1 is a decode 1 which causes a decoding of the instruction register which enables each instruction to access an address to which DEC 1 transfers control. DEC 2, which is decode 2, is similar to decode 1 except it permits a second group of addresses which can be different from the decode 1 address. JMPSR, which is jump subroutine, is a jump made to the micro-instruction given in the ten bit true address field, and the false address is loaded into the μJSR register specified in RAND 1. RTRN is return, where control is transferred to the micro-instruction whose (10 bits) is in the μJSR register specified by ROM bits 38,39. RET SAV is a return and save false address field, whereby control is transferred to the micro-instruction whose address (10 bits) is in the μJSR register specified by ROM bits 38 and 39. NILDIR is a no interrupt load IR, the same as load IR except pending interrupts are not allowed to defer the loading of the instruction register.

These above state changes involve a particular class of conditions for selecting the next micro-code word without a test, as opposed to the other conditions of the state change field which are individually tested to select the next micro-code word based on either the true or false address field, to determine which of the four pages of the ROM's is to be selected. These other conditions, which covers some thirty two (32) tests, involve routing the $\overline{\text{R BUF 35,36,37}}$ bits to the test multiplexer 164 along with the indication of which group (0,1,2, or 3) has been selected. Depending on the bit configuration for each of the four groups, a signal is passed through the multiplexer as RASEL to denote whether or not the true or false address field is the one to be selected for addressing the next micro-instruction.

Clearly, each of these addresses allows two hundred fifty-six (256) words. Since there are four Read Only Memories, a total of ten hundred and twenty-four (1,024) microprogram words can be addressed. The ten bit true address, which includes the page field including ROM R BUF bits 38 and 39, directly addresses all of the ROM. The current page is the page from which the last micro-instruction was fetched. The false address field is eight bits wide and always implies the current page.

Figure 15:
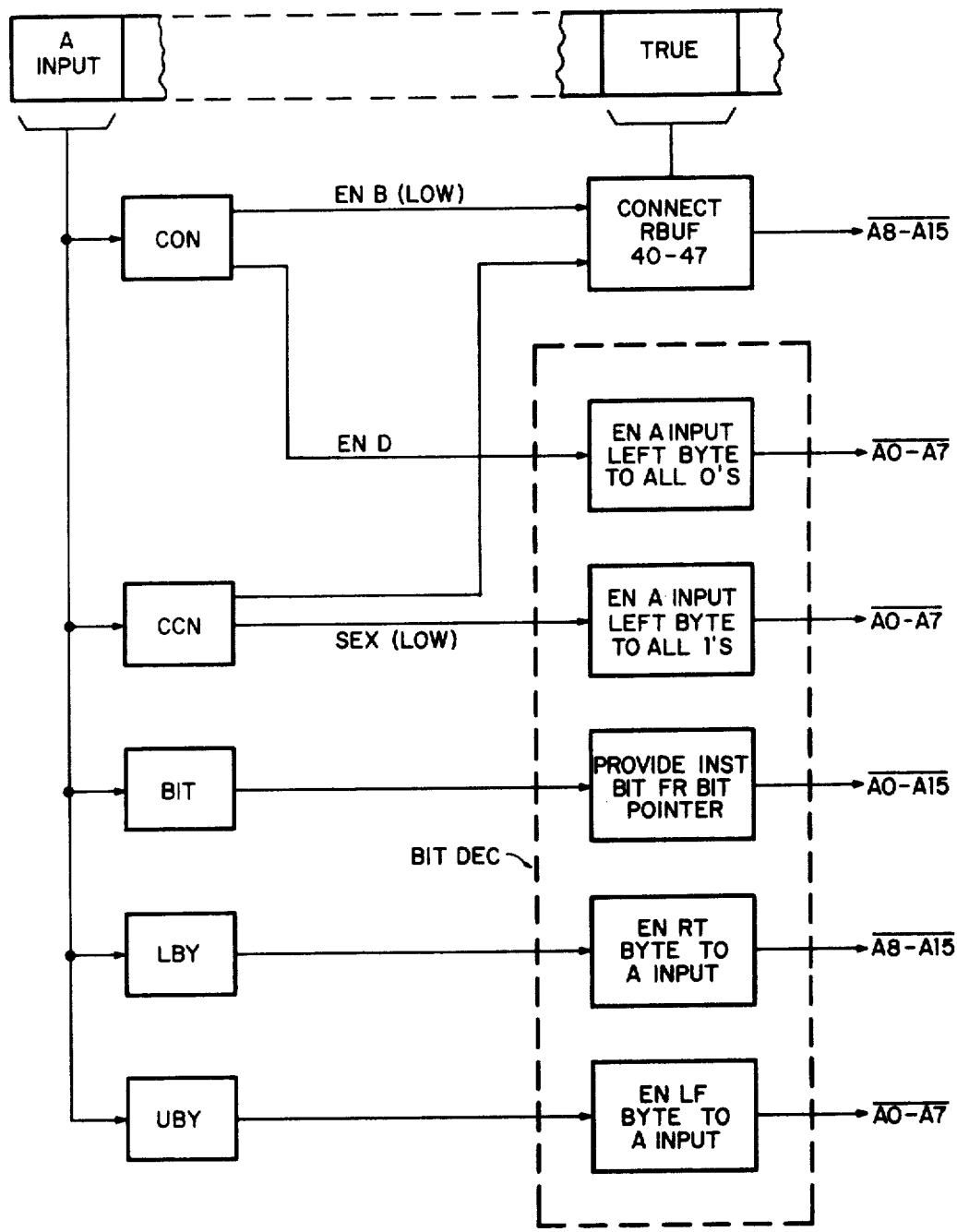

With reference to FIG. 15, the A-input control field defined by $\overline{\text{R BUF 0—3}}$ bits is shown, with a CON (constant) detection function, to route $\overline{\text{R BUF 40-47}}$ bits in the true field to the $\overline{\text{A8-15}}$ inputs to the ALU, the true address field here defining a constant value. At the same time, an enable signal also generated by the CON detection function forces the left byte to the ALU input to all zeros ($\overline{\text{A0-A7}}$) inputs to the ALU). On the other hand, detection of a CCN function (compliment of constant), in lieu of enabling the A-input left byte to all zeros, instead it is enabled to all ones. The constant value is used for loading dedicated memory addresses from the output of the adder (ALU) for stack pointing purposes. By conveniently incorporating the constant in the micro-instruction at a specified byte location to the A-input to the ALU, the bit decoder, which is also conveniently tied to the same point, is utilized to supply to the other byte all zeros and ones when a compliment function is desired. The constant might also be used for marking purposes or as a radix factor in adding decimal numbers.

The bit detection function detects a specified A-input bit configuration for generating an instruction bit from the bit pointer. The bit pointer, as may be seen from FIG. 10, includes these four bits $\overline{\text{ALU 12-15}}$ in the count register 145 received from the ALU output. These four bits are routed to a bit decoder ROM 144 for generating the selected bit instruction on leads $\overline{\text{A0-A15}}$ to the A-input of the ALU. Thus, the bit decoder is additionally conveniently manipulated to serve as bit instruction.

Also coded within the A-input control field is a designation for LBY which when detected will enable, through the bit decode ROM, the right byte to the ALU input to be all zeros. On the other hand, a UBY detection from a selected configuration in the A-input field with enable, through the bit decoder ROM, the left byte to the ALU A0-A7 to be all zeros.

The invention may be embodied in yet other specific forms without departing from the spirit or essential characteristics thereof. Thus, the present embodiments are to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:
1. In a computer comprising
   memory means for storing at least computer instructions, microprogram processor means for providing microprograms of sequences of micro-instructions for performing first certain of said computer instructions, and
   memory bus means connected from said memory means for conducting memory output signals representing said computer instructions to said microprogram processor means,
   said microprogram processor means including
      instruction register means connected from said memory bus means for receiving and holding one of said computer instructions at a time,
      micro-instruction control store means connected from said instruction register means for storing and providing said micro-instructions,
      controllable connection means connected from said memory bus means for providing first certain of said memory output signals representing portions of second certain of said first certain of said computer instructions present on said memory bus means,
      buffer means (1) connected from said control store means for selectively receiving and holding one of said micro-instructions at a time, and (2) connected from said controllable connection means for selectively receiving and holding said portions of said second certain of said first certain of said computer instructions, and
      micro-instruction decoding means connected from said buffer means for providing control signals to at least said microprogram processor means,
   the method to be practiced therein for generating and responding to the initial micro-instruction of each of said sequences of micro-instructions in each of said microprograms for performing each one of said second certain of said first certain of said computer instructions, said method comprising the steps of:
      (A) decoding a present one of first certain of said micro-instructions held in said buffer means by operation of said decoding means to provide first certain of said control signals to said microprogram processor means from said micro-instruction decoding means to initiate start of a next one of said sequences of micro-instructions of a next one of said second certain of said first certain of said computer instructions;

(B) enabling said instruction register means responsive to said first certain of said control signals from said micro-instruction decoding means to receive from said memory bus means and hold in said instruction register said next one of said second certain of said first certain of said computer instructions;

(C) enabling said controllable connection means responsive to first certain of said control signals from said micro-instruction decoding means to provide said first certain of said memory output signals representing said portions of said next one of said second certain of said first certain of said computer instructions to said buffer means from said memory bus means;

(D) enabling said buffer means responsive to said first certain of said control signals from said micro-instruction decoding means to (1) receive said first certain of said memory output signals from said controllable connection means and (2) to hold in said buffer means said portions of said next one of said second certain of said first certain of said computer instructions from said memory bus means, so that the initial micro-instruction of said next one of said sequences of micro-instructions is provided to said buffer means directly from said memory bus means.

2. The method of claim 1 wherein said microprogram processor means further includes computer instruction decoding means connected from said instruction register means and responsive to each one of third certain of said first certain of said computer instructions held in said instruction register means, said computer instruction decoding means providing micro-instruction address signals to said micro-instruction control store means for selecting each of said micro-instructions stored in said micro-instruction control store means for performing said each one of said third certain of said first certain of said computer instructions held in said instruction register means, and said micro-instruction control store means is responsive to said micro-instruction address signals from said computer instruction decoding means for providing each selected said micro-instruction to said buffer means; and said method further includes the steps of decoding a present one of second certain of said micro-instructions held in said buffer means by operation of said micro-instruction decoding means to provide second certain of said control signals to said computer instruction decoding means from said micro-instruction decoding means, and controlling said computer instruction decoding means responsive to said second certain of said control signals from said micro-instruction decoding means to provide at least one indirect address signal of said micro-instruction address signals to said micro-instruction control store means from said computer instruction decoding means to select at least one indirect micro-instruction from said micro-instructions stored in said control store means.

3. The method of claim 2 wherein said computer further comprises program counter means responsive to third certain of said control signals from said micro-instruction decoding means for (1) counting said computer instructions as said computer instructions are performed and (2) providing computer instruction address signals to said memory means for selecting successive said computer instructions from said computer instructions stored in said memory means as said computer instructions are performed, said memory means is responsive to said computer instruction address signals to provide said memory output signals on said memory bus means representing said computer instructions selected by said computer instruction address signals from said program counter means; and said method further comprises the steps of decoding by operation of said micro-instruction decoding means a present one of third certain of said micro-instructions held in said buffer means to (1) provide said third certain of said control signals to said program counter means for (2) incrementing of said program counter means to (3) generate a next one of said computer instruction address signals to said memory means and providing said next one of said computer instruction address signals to said memory means from said program counter means to fetch a next one of said computer instructions, so that, responsive to said next one of said computer instruction address signals from said program counter means, said memory means provides said memory output signals on said memory bus means representing said next one of said computer instructions to said microproprogram processor means.

4. The method of claim 3 further comprising the steps of:

decoding by operation of said decoding means a subsequent one of fourth certain of said micro-instructions held in said buffer means to provide subsequent said third certain of said control signals to said program counter means from said micro-instruction decoding means for (1) incrementing of said program counter means to (2) generate a subsequent one of said computer instruction address signals to said memory means from said program counter means before (a) occurrence of a next one of said first certain of said micro-instructions in said buffer means, (b) said providing of a next one of said first certain of said control signals to said instruction register means from said micro-instruction decoding means and (c) said responsive receiving of said next one of said computer instructions into said instruction register means from said memory bus means; and, providing said subsequent one of said computer instruction addresses to said memory means from said program counter means to fetch a subsequent one of said computer instructions, so that responsive to said subsequent one of said computer instruction address signals, said memory means provides said memory output signals on said memory bus means representing said subsequent one of said computer instructions to said microprogram processor means before said next one of said computer instructions is received into said instruction register means, thereby skipping said next one of said computer instructions which otherwise would have been loaded into said instruction register means from said memory bus means and performed by said microprogram processor means.

5. The method of claim 1 wherein said computer further comprises program counter means responsive to third certain of said control signals from said micro-instruction decoding means for (1) counting said computer instructions as said computer instructions are performed and (2) providing computer instruction address signals to said memory means for selecting successive said computer instructions from said computer instructions stored in said memory means as said computer instructions are performed, said memory means is responsive to said computer instruction address signals to provide said memory output signals on said memory bus means representing said computer instructions selected by said computer instruction address signals from said program counter means; and said method further comprises the steps of decoding by operation of said micro-instruction decoding means a present one of third certain of said micro-instructions held in said buffer means to (1) provide said third certain of said control signals to said program counter means for (2) incrementing of said program counter means to (3) generate a next one of said computer instruction address signals to said memory means, and providing said next one of said computer instruction address signals to said memory means from said program counter means to fetch a next one of said computer instructions, so that, responsive to said next one of said computer instruction address signals from said program counter means, said memory means provides said memory output signals on said memory bus means representing said next one of said computer instructions to said microprogram processor means.

6. The method of claim 5 further comprising the steps of:

decoding by operation of said decoding means a subsequent one of fourth certain of said micro-instructions held in said buffer means to provide subsequent said third certain of said control signals to said program counter means from said micro-instruction decoding means for (1) incrementing of said program counter means to (2) generate a subsequent one of said computer instruction address signals to said memory means from said program counter means before (a) occurrence of a next one of said first certain of said micro-instructions in said buffer means, (b) said providing of a next one of said first certain of said control signals to said instruction register means from said micro-instruction decoding means and (c) said responsive receiving of said next one of said computer instructions into said instruction register means from said memory bus means; and, providing said subsequent one of said computer instruction addresses to said memory means from said program counter means to fetch a subsequent one of said computer instructions, so that responsive to said subsequent one of said computer instruction address signals, said memory means provides said memory output signals on said memory bus means representing said subsequent one of said computer instructions to said microprogram processor means before said next one of said computer instructions is received into said instruction register means, thereby skipping said next one of said computer instructions which otherwise would have been loaded into said instruction register means from said memory bus means and performed by said microprogram processor means.

7. In a computer comprising memory means for storing at least a sequence of computer instructions to be performed by said computer, microprogram processor means for providing microprograms of sequences of micro-instructions for performing first certain of said computer instructions, said first certain of said computer instructions including at least one no-op computer instruction to be performed by at least one of said sequences of micro-instructions selected from an extended set of micro-instructions, and memory bus means connected from said memory means for conducting memory output signals representing said computer instructions to said microprogram processor means, said microprogram processor means including micro-instruction control store means for storing and providing said micro-instructions, said micro-instruction control store means having a first micro-instruction memory space for storing a nonextended set of said micro-instructions, and a second micro-instruction memory space for storing said extended set of said micro-instructions, micro-instruction decoding means connected from said micro-instruction control store means for providing control signals to at least said microprogram processor means, and computer instruction depending means connected from said memory bus for providing micro-instruction address signals to said micro-instruction control store means for selecting each of said micro-instructions stored in said micro-instruction control store means for performing each of said first certain of said computer instructions, said computer instruction decoding means including means responsive to first certain portions of said each one of said first certain of said computer instructions for providing first certain of said micro-instruction address signals to said micro-instruction control store means for selecting said at least one of said sequences of micro-instructions from said extended set of said micro-instructions stored in said second micro-instruction space of said micro-instruction control store means when a present of said first certain of said computer instructions is said at least one no-op computer instruction, said micro-instruction control store means responsive to said micro-instruction address signals from said computer instruction decoding means for providing each selected said micro-instruction to said micro-instruction decoding means, the method to be practiced therein for providing said at least one of first certain of said microprograms of sequences of micro-instructions from said extended set of micro-instructions in response to said no-op computer instruction, comprising the steps of:

(A) decoding by operation of said micro-instruction decoding means a present one of first certain of said micro-instructions from said micro-instruction control store means to provide first certain of said control signals to said microprogram processor means from said micro-instruction decoding means to initiate start of a next one of said sequences of micro-instructions of a next one of said first certain of said computer instructions;

(B) enabling said computer instruction decoding means responsive to said first certain of said control signals from said micro-instruction decoding means to (1) receive from said memory bus means said next one of said first certain of said computer instructions, (2) decode said first certain portion of said next one of said first certain of said computer instructions to determine whether said next one of said first certain of said computer instructions is said at least one no-op computer instruction, and (3) provide said first certain of said micro-instruction address signals to said micro-instruction control store means from said computer instruction decoding means when said next one of said first certain of said computer instructions is said at least one no-op computer instruction; and (C) controlling said micro-instruction control store means responsive to said first certain of said micro-instruction address signals to said micro-instruction control store means from said computer instruction decoding means to (1) provide said at least one of said sequences of said micro-instructions from said extended set of micro-instructions stored in said second micro-instruction space of said micro-instruction control store means to said micro-instruction decoding means from said micro-instruction control store means to (2) perform at least one no-op instruction.

* * * * *